(12) United States Patent
Li et al.

(10) Patent No.: US 6,579,018 B1
(45) Date of Patent: Jun. 17, 2003

(54) FOUR-FIBER RING OPTICAL CROSS CONNECT SYSTEM USING 4×4 SWITCH MATRICES

(75) Inventors: Ming-jun Li, Horse Heads, NY (US); Mark J. Soulliere, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/465,066

(22) Filed: Dec. 16, 1999

(51) Int. Cl.[7] ................................................ H04B 10/08
(52) U.S. Cl. ................................ 398/4; 398/83; 398/7; 398/49
(58) Field of Search ........................... 398/4, 49, 7, 83; 385/16, 17, 18, 19, 24, 37

(56) References Cited

U.S. PATENT DOCUMENTS 6,023,359 A * 2/2000 Asahi .......................... 359/119
6,195,186 B1 * 2/2001 Asahi .......................... 359/110
6,222,653 B1 * 4/2001 Asahi .......................... 359/110

FOREIGN PATENT DOCUMENTS

WO    WO 98/25365    6/1998

OTHER PUBLICATIONS

Elrefaie, A.F.; "Multiwavelength Survivable Ring Network Architectures"; IEEE, May 23–26, 1993.

Fujimoto et al; "Broadband Subscriber Loop System Using Multi–Gigabit Intelligent Optical Shuttle Nodes"; IEEE Nov. 15–18, 1987.

* cited by examiner

Primary Examiner—Leslie Pascal
Assistant Examiner—Hanh Phan
(74) Attorney, Agent, or Firm—Gregory V. Bean

(57) ABSTRACT

An optical cross-connect system provides 4×4 switching matrices and self-healing from any single point of failure. The switching matrices route working traffic and redundant protection traffic between a plurality of client network elements and an optical ring. The system also has a client interface for transporting the working traffic and the protection traffic between the switching matrices and the client network elements. The optical cross-connect system further includes a ring interface for transporting the working traffic and the protection traffic between the switching matrices and the optical ring. The switching matrices are structured so that protection is provided from single point failures by electrical switching at the client network element location. This significantly reduces the need for optical switching within the matrices.

13 Claims, 26 Drawing Sheets

|  | Client NE 1 | Client NE 2 |
|---|---|---|
| Working Traffic | Add | Drop |
| Protection Traffic | Drop | Add |

4X4 Matrix #2

Figure 27

|  | Client NE 1 | Client NE 2 |
|---|---|---|
| Working Traffic | Drop | Add |
| Protection Traffic | Add | Drop |

4X4 Matrix #1

Figure 26

FOUR-FIBER RING OPTICAL CROSS CONNECT SYSTEM USING 4×4 SWITCH MATRICES

BACKGROUND OF THE INVENTION

1. Field of the Invention

The present invention generally relates to optical protection switching architectures. More particularly, the present invention is directed to an optical cross-connect system utilizing 4×4 switching matrices for providing self-healing from any single point of failure.

2. Technical Background

In the rapid development of optical communication systems, networking architectures have become increasingly complex. Ring topologies have arisen to provide a number of networking elements with the ability to both listen and transmit on optical channels within the optical ring. In such a ring topology, consecutive nodes are connected by point-to-point links which are arranged to form a single closed path or ring. Information is transmitted from node to node around the ring, and the interface at each node is an active device that has the ability to create and accept messages. The interface serves not only as a user attachment point but also as an active repeater for re-transmitting messages that are addressed to other nodes.

A number of implementation considerations must be taken into account when configuring a ring network. First, rings must be physically arranged so that all nodes are fully connected. Whenever a node is added to support new devices, transmission lines have to be placed between this node and its two nearby, topologically adjacent nodes. A break in any line, the failure of a node, or adding a new node threatens to disrupt network operation. A variety of steps can be taken to circumvent these problems, although this generally increases the complexity of the ring interface electronics as well as the associated costs.

The American National Standards Institute (ANSI) has released a collection of standards for synchronous optical networks (SONET's) to address a growing bandwidth problem in the wide area network (WAN) environment. These standards provide signaling protocols for various types of optical networks but fail to address optical cross-connect systems with any specificity. Another problem with structuring a bidirectional optical ring around SONET standards, is the possibility of transmitting data which is not SONET based. For example, gigabyte Ethernet signals transmitted to digital clients often do not fall within SONET standards. Thus, it is desirable to provide a bidirectional optical ring architecture with the flexibility of operating within or out of SONET protocols. It is also desirable to provide improved protection against single point failures and network changes.

SUMMARY OF THE INVENTION

The above and other objects are provided by an optical cross-connect system having a pair of 4×4 optical switching matrices. The switching matrices route working traffic and redundant protection traffic between a plurality of clients and an optical ring. The optical cross-connect system also has a client interface for transporting the working traffic and the protection traffic between the switching matrices and the clients. The optical cross-connect system further includes a ring interface for transporting the working traffic and the protection traffic between the switching matrices and the optical ring. The switching matrices are structured so that protection is provided from single point failures by electrical switching at the client location. This significantly reduces the need for optical switching within the switching matrices. The 4×4 architecture of the matrices provides a fundamental building block which allows ultimate flexibility in design of optical rings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

FIG. 26 is a logic table representing the structure of a first switching matrix in accordance with the preferred embodiment; and FIG. 27 is a logic table of the structure of a second switching matrix in accordance with the preferred embodiment.

DETAILED DESCRIPTION OF THE PREFERRED EMBODIMENTS

Figure 1:
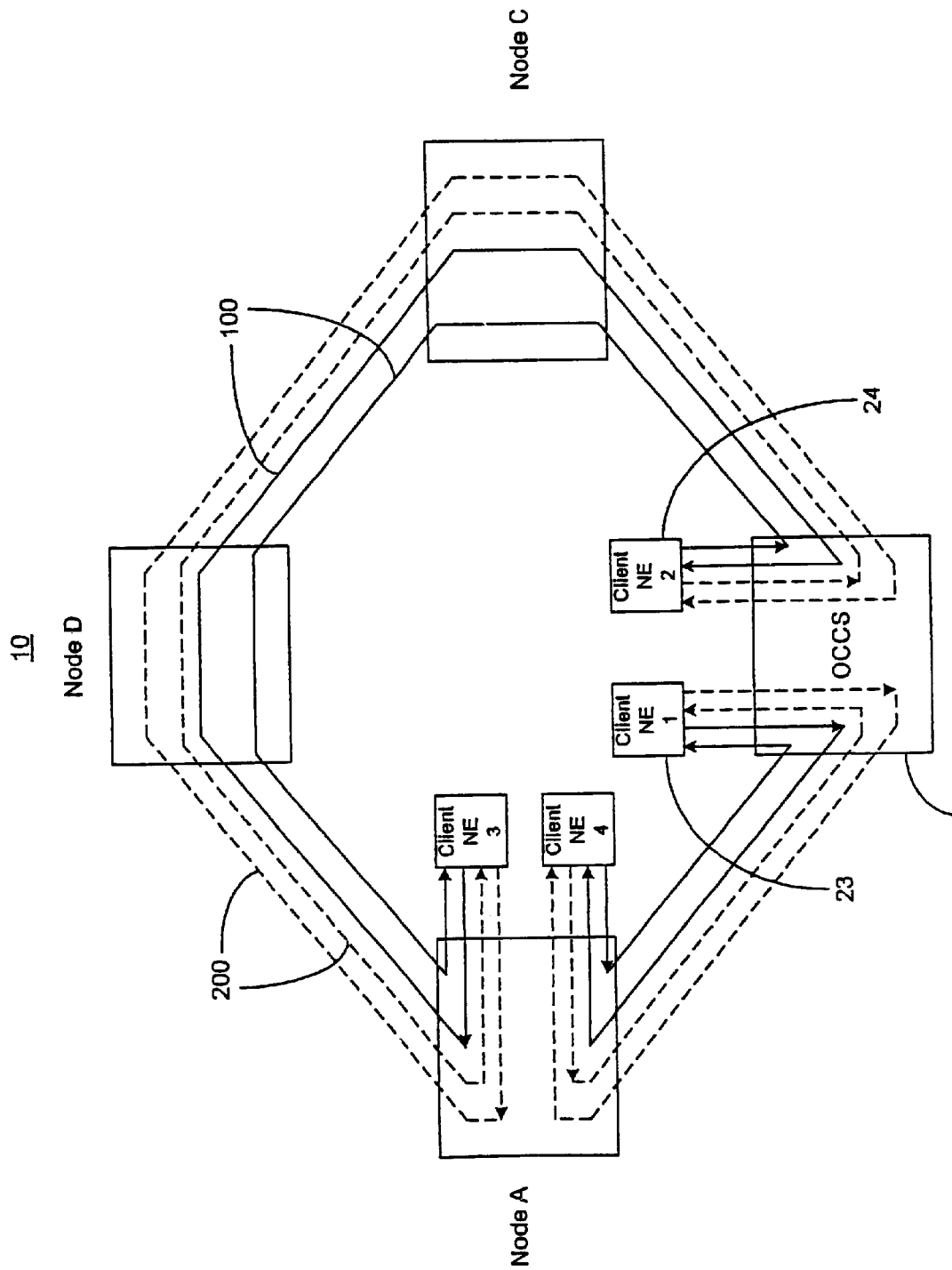
FIG. 1 is a schematic illustration of a bidirectional optical ring implementing the presently preferred cross-connect system.

Reference will now be made in detail to the present preferred embodiments of the invention, examples of which are illustrated in the accompanying drawings. Wherever possible, the same reference numerals will be used throughout the drawings to refer to the same or like parts.

Referring to FIG. 1, a four-fiber bi-directional optical communication ring implementing the presently preferred optical cross-connect system is illustrated at 10. The optical ring is made up of a plurality of nodes, working spans 100, and protection spans 200. The working spans 100 and protection spans 200 are preferably implemented via fiber optic waveguide communication channels. Each node has an optical cross-connect system (OCCS) and one or more network elements shown as client network elements 1 through 4. A node can be either an add drop node, such as Nodes A and B, or a through node, such as Nodes C and D. Essentially, add drop nodes connect to network elements, whereas through nodes do not connect to client network elements. Under normal conditions, working spans 100 run between nodes and carry working traffic. Similarly, protection spans 200 run between nodes and carry redundant protection traffic.

Figure 2:
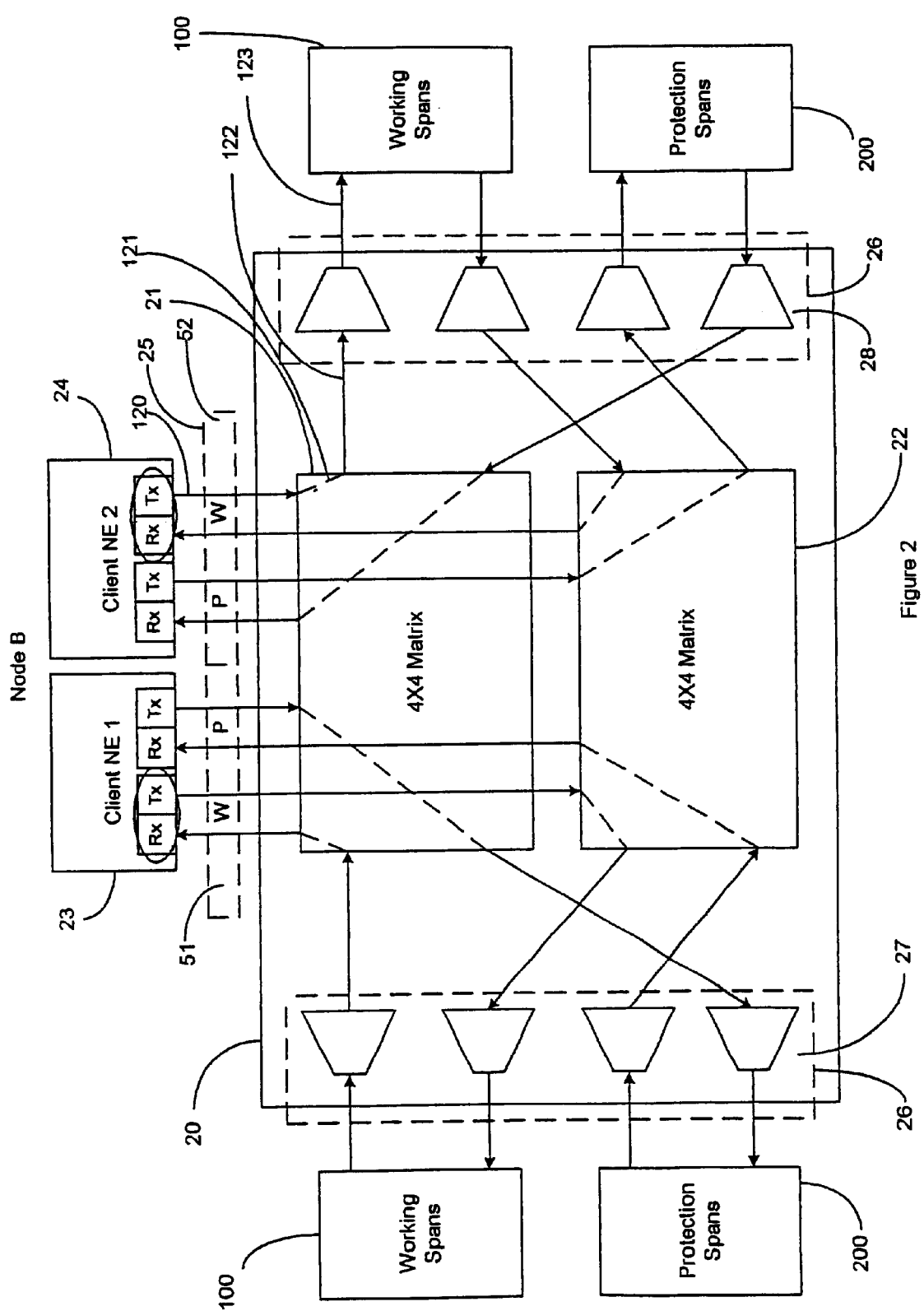
FIG. 2 is a more detailed view of node B of FIG. 1.

Referring to FIG. 2, the preferred embodiment for the OCCS at Node B is shown generally at 20. OCCS 20 has a pair of 4×4 optical switching matrices 21 and 22 for routing working traffic and redundant protection traffic between first and second client network elements (NE's) 23 and 24, and the rest of the optical ring 10. OCCS 20 also has a client interface 25 for transporting the working traffic and the protection traffic between switching matrices 21 and 22, and first and second client network elements 23 and 24. OCCS 20 further includes a ring interface 26 for transporting the working traffic and the protection traffic between the switching matrices 21 and 22 and the optical ring 10.

Figure 3:
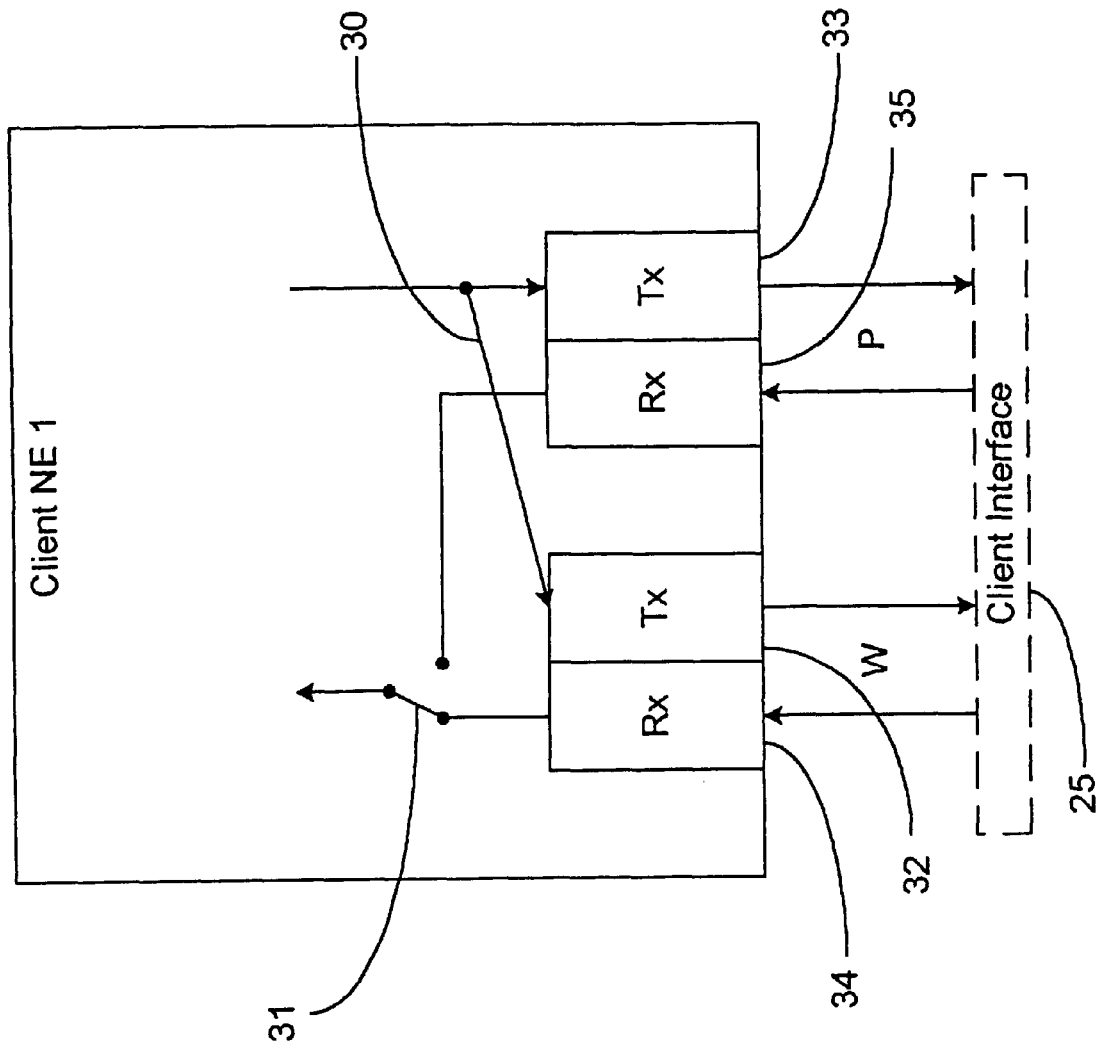
FIG. 3 is a more detailed view of the first client network element of FIGS. 1 and 2.

Turning now to FIG. 3, it can be seen that each client network element has an electrical bridge 30 and a protection switch 31. The electrical bridge 30 adds working traffic and protection traffic to the client interface 25 via transmitters 32 and 33. The client interface 25 then transports the added working traffic and protection traffic to the pair of switching matrices 21 and 22. During normal operation, the protection switch 31 selects the working traffic as an incoming signal and the signal is received through receiver 34. This signal is dropped from switching matrix 21. While the circuitry shown here is relatively simple, more complex designs can be used to achieve the same objective.

Returning to FIG. 2, the matrix structure will now be described. A pair of 4×4 switching matrices includes a first matrix 21 and a second matrix 22. Generally, each matrix adds and drops traffic to and from the optical ring 10. Adding is the process of routing a signal transmitted from a client network element to the optical ring 10, whereas dropping involves the process of routing a signal from the optical ring 10 to a client network element. The client network element retrieves the signal from either receiver 34 or 35 (FIG. 3) depending on the position of protection switch 31.

Specifically, the first matrix 21 adds working traffic from the second client network element 24 to the optical ring 10. As an example, it can be seen that the signal travels along the path 120, 121, 122, and 123 before reaching working span 100 of the optical ring 10. The first matrix 21 also adds protection traffic from the first client network element 23 to the optical ring 10. The first matrix 21 drops the working traffic from the optical ring 10 to the first client network element 23, and drops protection traffic from the optical ring 10 to the second client network element 24. A logic table of this structure is shown in FIG. 26.

The second matrix 22 adds working traffic from the first client network element 23 to the optical ring 10, and adds protection traffic from the second client network element 24 to the optical ring 10. The second matrix 22 drops working traffic from the optical ring 10 to the second client network element 24, and drops protection traffic from the optical ring 10 to the first client network element 23. A logic table of this structure is shown in FIG. 27. As will be discussed below, the use of 4×4 matrix pairs in conjunction with the above distribution of traffic allows for self-healing of single point failures with minimal optical switching.

Figure 4:
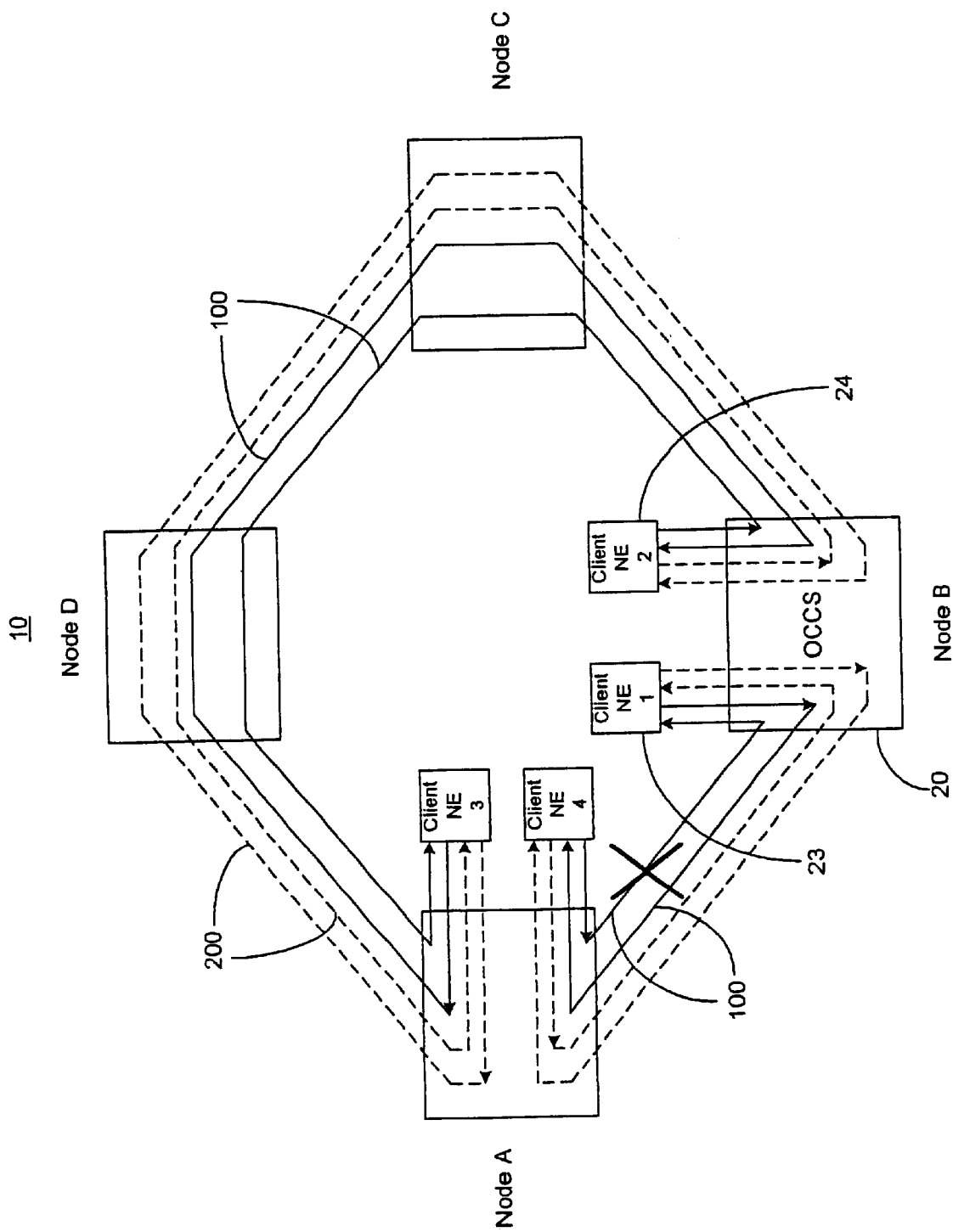
FIG. 4 is a schematic illustration of a single point failure of a working span between add drop nodes.
Figure 5:
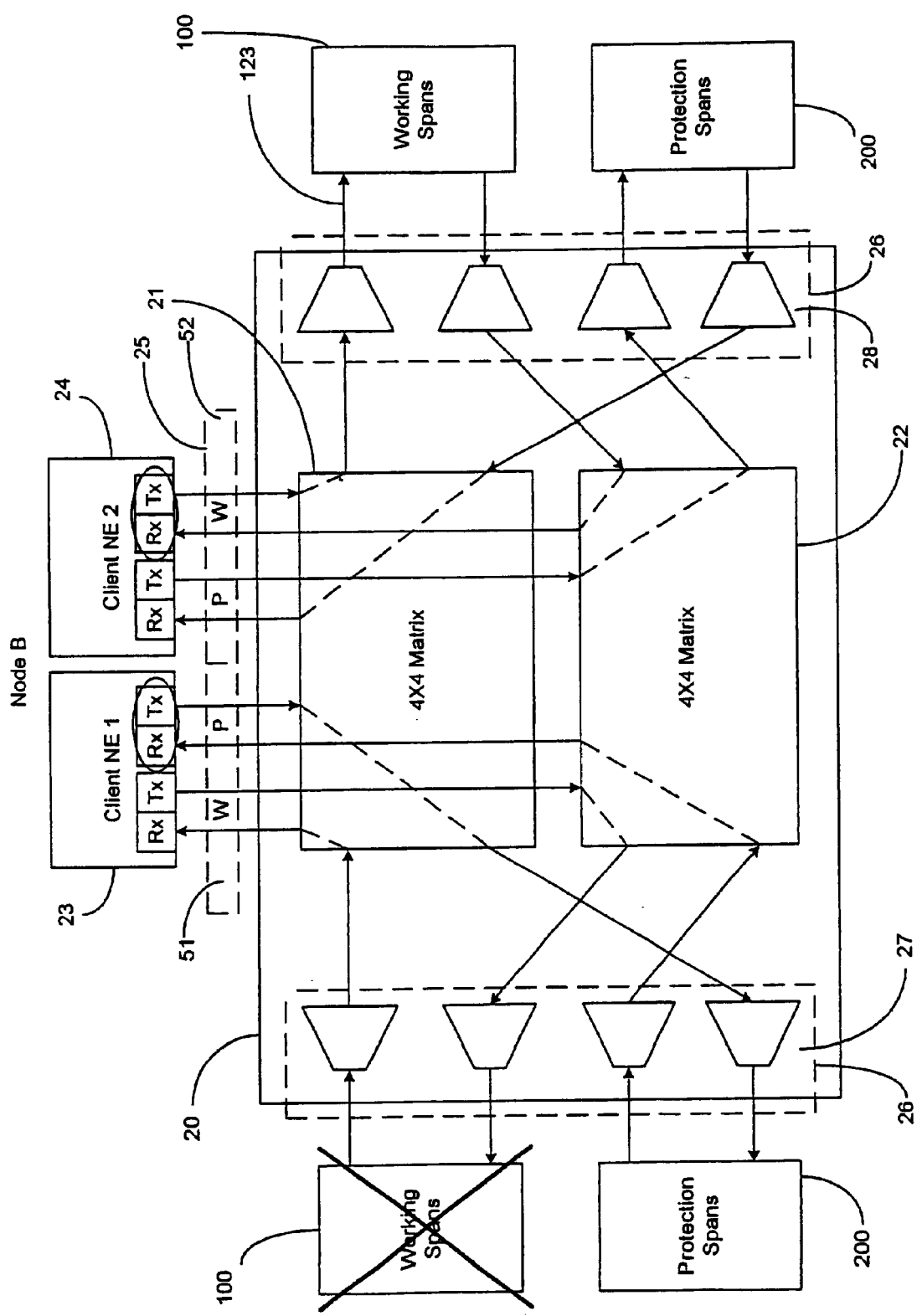
FIG. 5 is a more detailed view of node B of FIG. 4.

With reference to FIG. 4, single point failures can occur in a number of different locations. For example, a failure can occur in a working span 100 anywhere along the optical ring 10. In this case, the protection switch 31 selects the protection traffic as an incoming signal and the switching matrices 21 and 22 do not change. Thus, the selection is done by client network elements 23 and 24 via the protection switch 31 located downstream from the two receivers 34 and 35 (FIG. 3). This switching process therefore restores the traffic connection between network elements (Node A and Node B) on either side of the failure as shown in FIG. 4. FIG. 5 better illustrates the ability of the switching matrices 21 and 22 to maintain their switch positions during such a failure.

Figure 6:
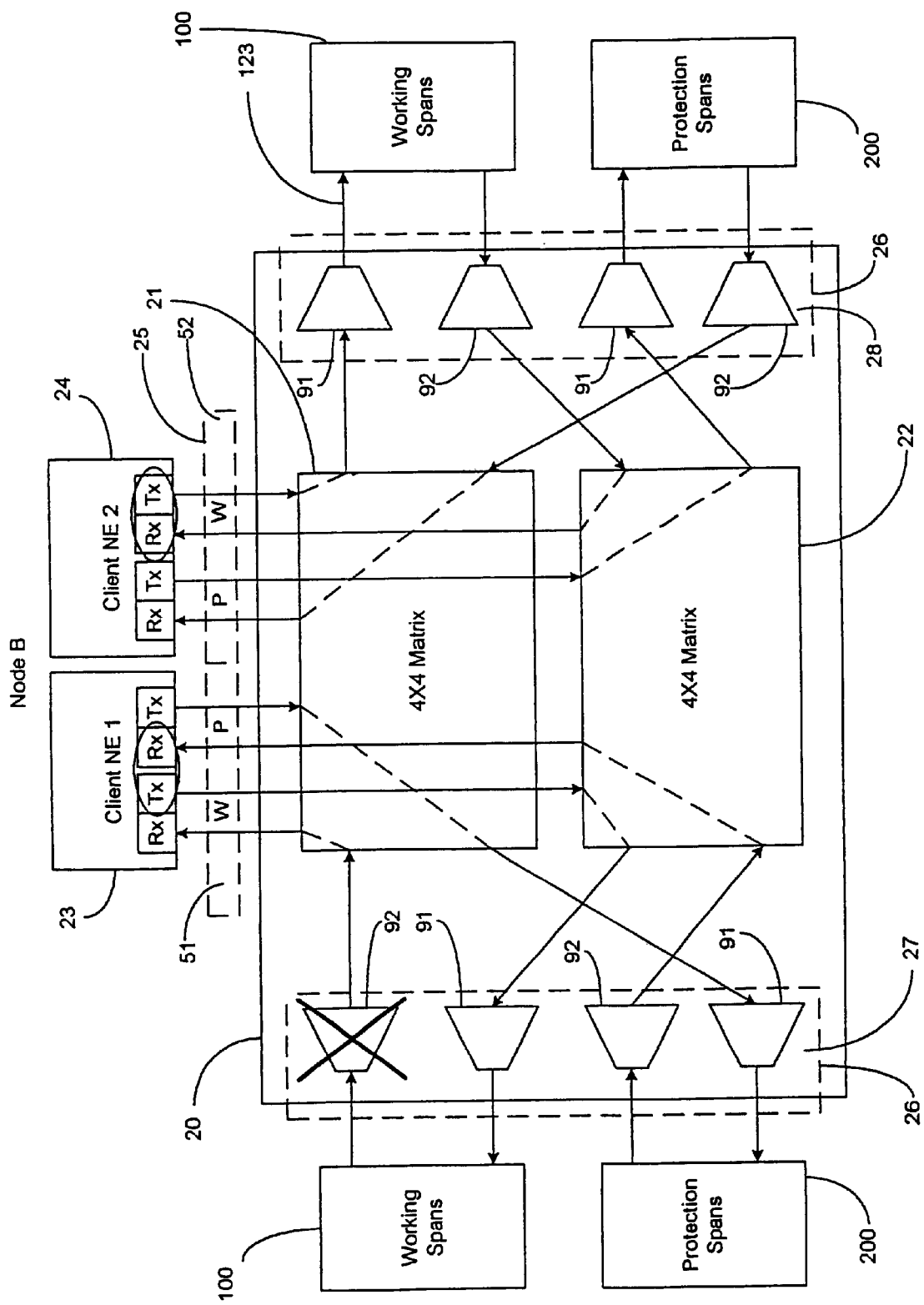
FIG. 6 is a detailed view of an optical cross-connect system with a single point failure of a demultiplexer.

A single point failure can also occur in the ring interface 26 as shown in FIG. 6. Each ring interface has a first port 27 and a second port 28. Each port (27 and 28) has two multiplexers 91 for multiplexing the working traffic and the protection traffic to and from the switching matrices 21 and 22. Each port (27 and 28) also has two demultiplexers 92 for demultiplexing the working traffic and the protection traffic to the switching matrices 21 and 22. It is important to note that there may be other equipment present, such as optical amplifiers, attenuators, and connectors. More importantly, all of these devices and assemblies may be subject to failure. Thus, the ability to self-heal shown in FIG. 6 can also apply to these types of failures. It can be appreciated that only the protection switches 31 of the client network elements affected by the failure need be thrown in the case of failure.

Figure 7:
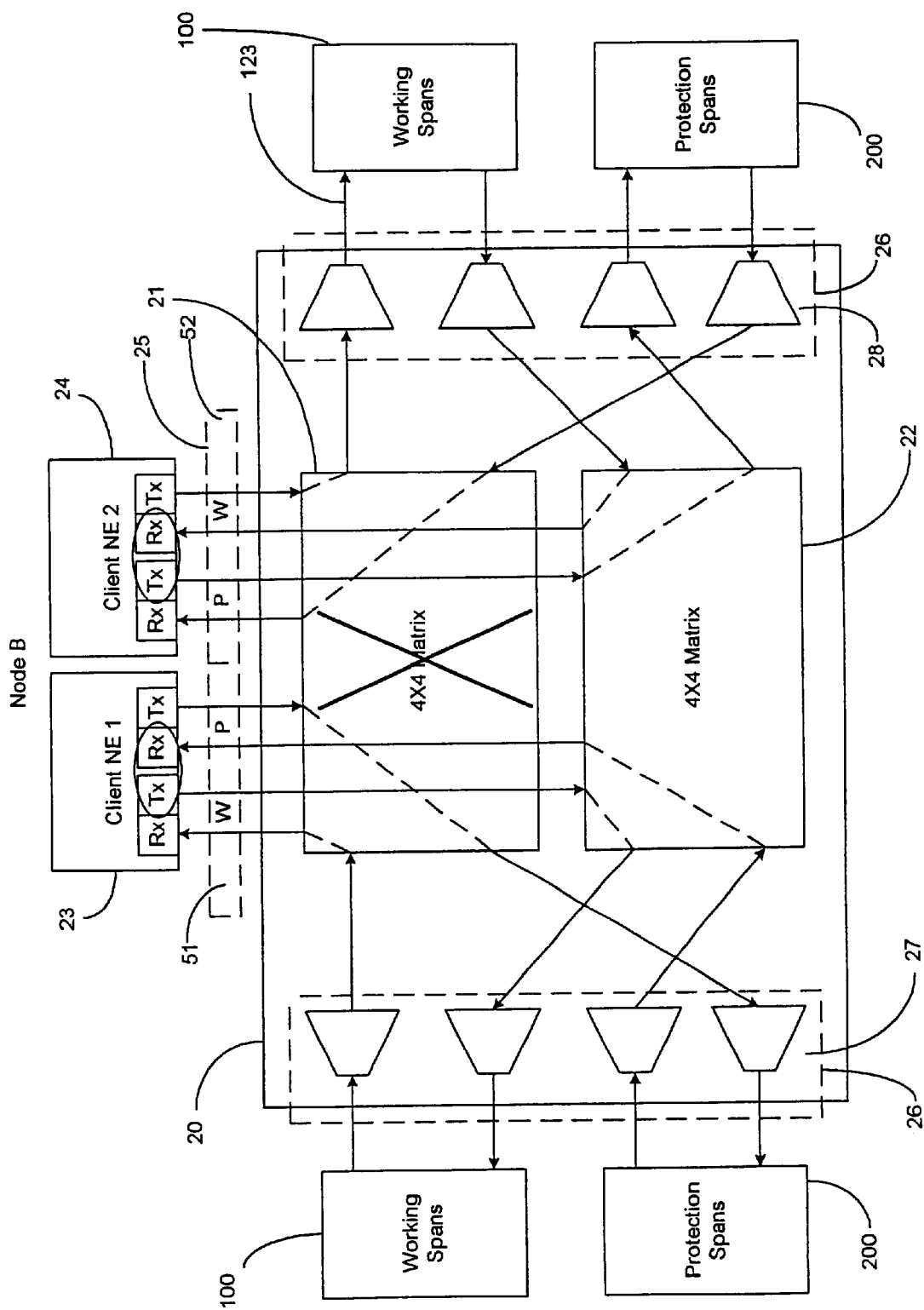
FIG. 7 is a detailed view of an optical cross-connect system with a single point failure of a 4×4 switching matrix.
Figure 8:
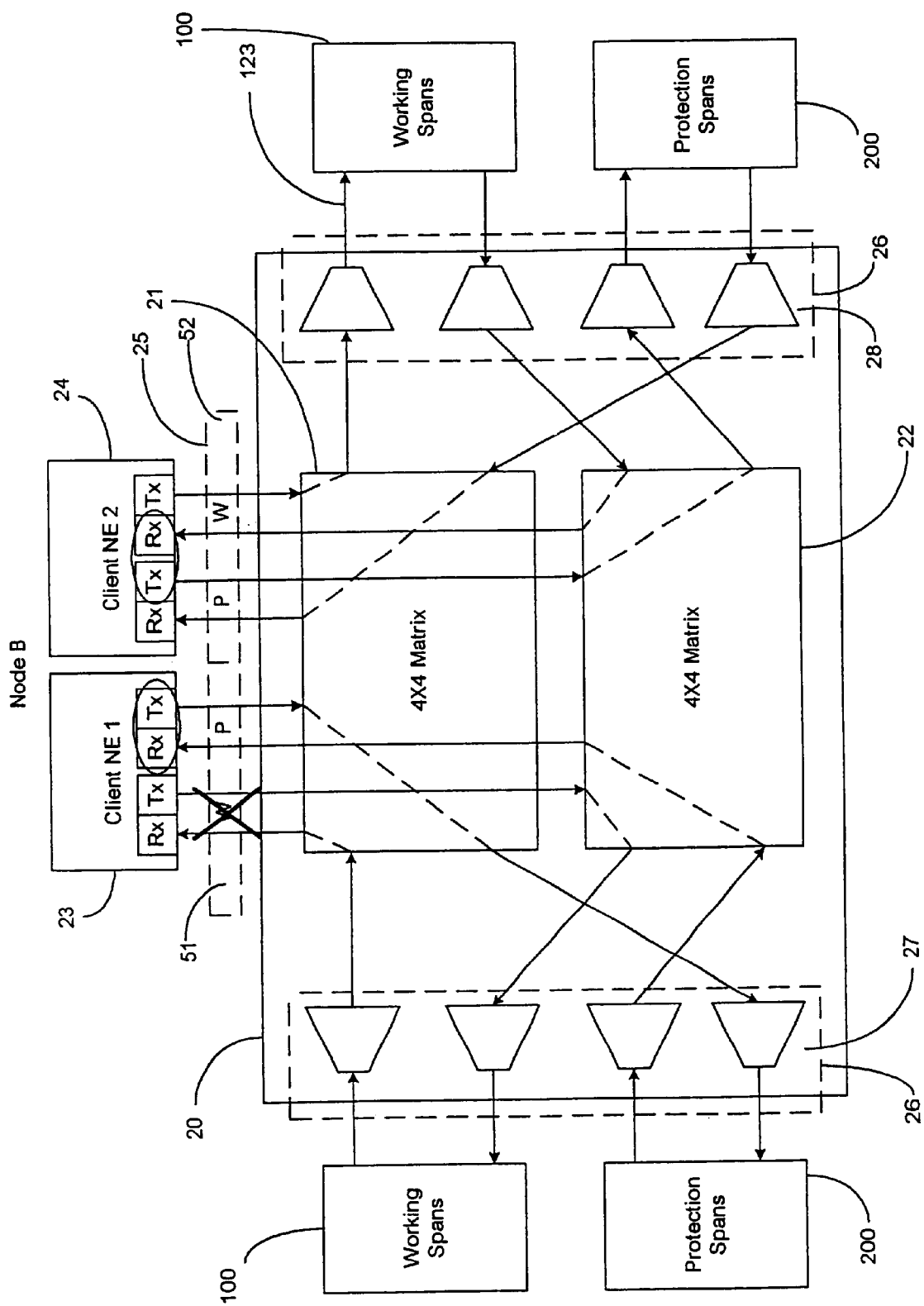
FIG. 8 is a detailed view of an optical cross-connect system with a single point failure of a working span in a client interface.

FIG. 7 shows how the protection traffic is chosen when a switch matrix such as optical switch matrix 21 fails. Here, protection traffic is received by the first client network element 23 and transmitted by the second client network element 24. A similar procedure is followed for failure of switch matrix 22. FIG. 8 shows how the protection traffic is selected as an incoming and an outgoing signal when the single point failure occurs in the client interface 25. It will be appreciated that the client interface 25 has a first client span 51 and a second client span 52. The first client span 51 carries the working traffic and the protection traffic from the switching matrices 21 and 22 to the first client network element 23, whereas the second client span 52 carries the working traffic and the protection traffic from the switching matrices 21 and 22 to the second client network element 24. In the preferred embodiment, each span 100, 200 comprises two unidirectional optical fibers, but a single bi-directional optical fiber can be used with additional splitting components.

Figure 9:
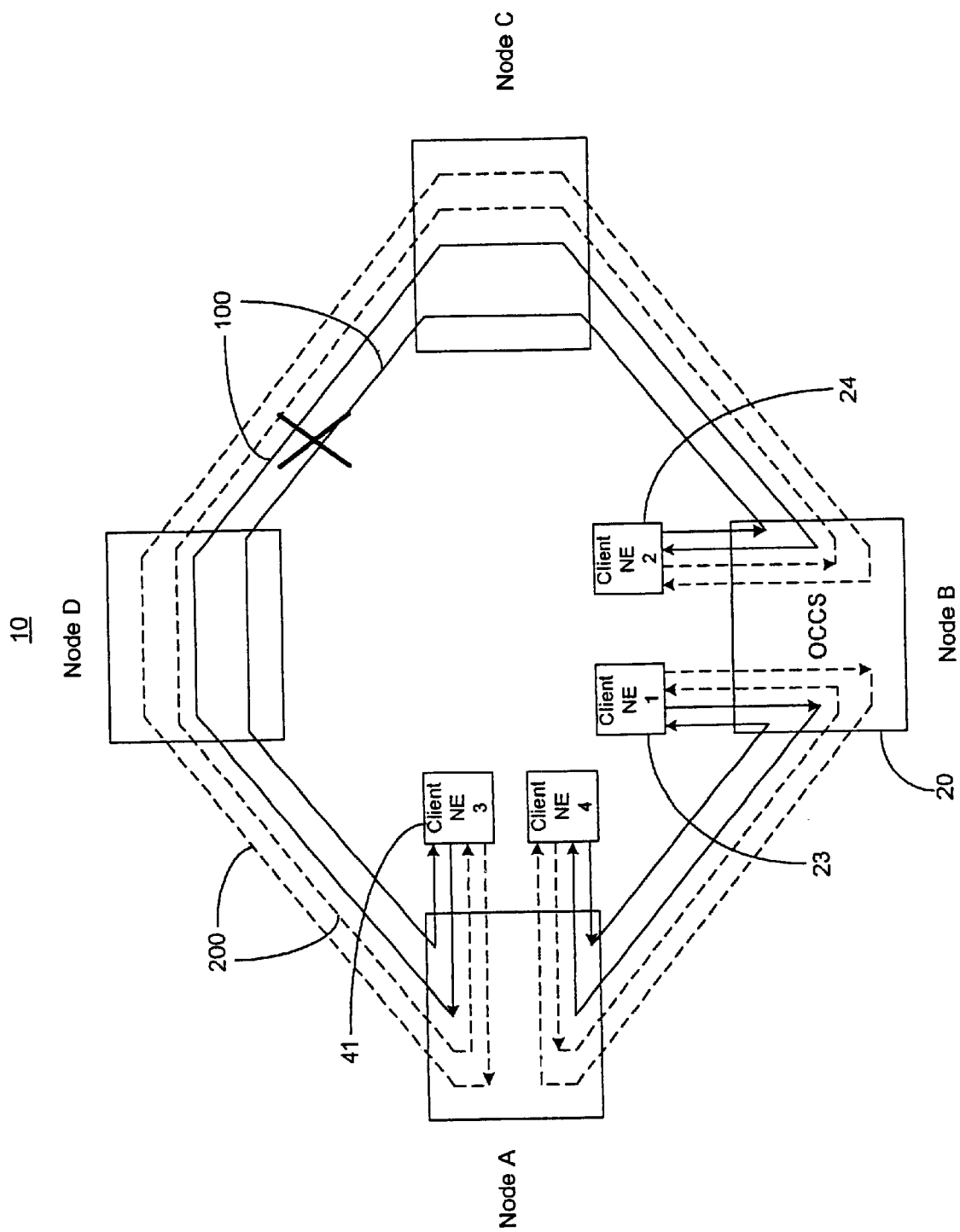
FIG. 9 is a schematic illustration of a bidirectional optical ring with a single point failure of a working span which is non-adjacent to a add drop node.
Figure 10:
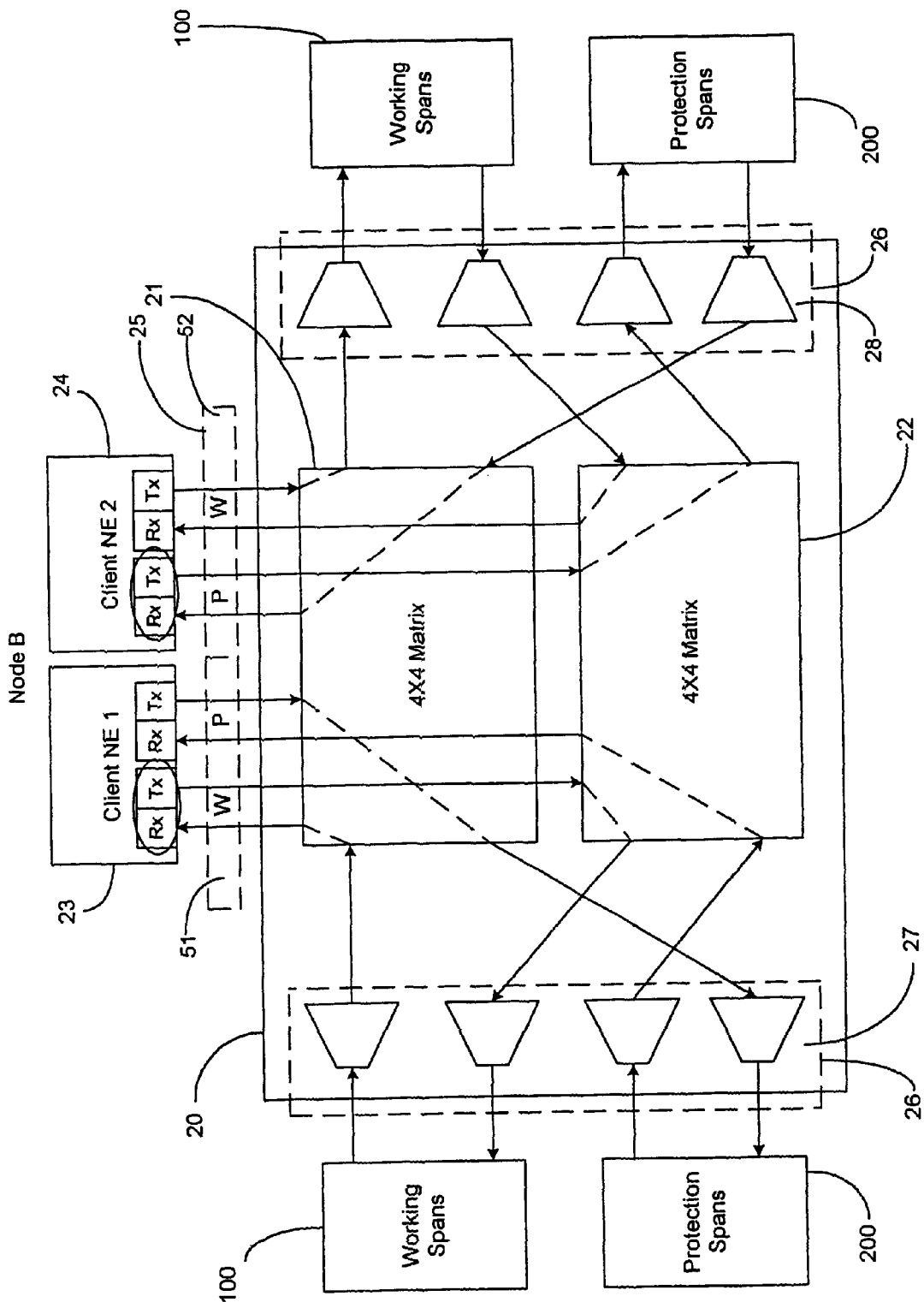
FIG. 10 is a more detailed view of node B of FIG. 9.
Figure 11:
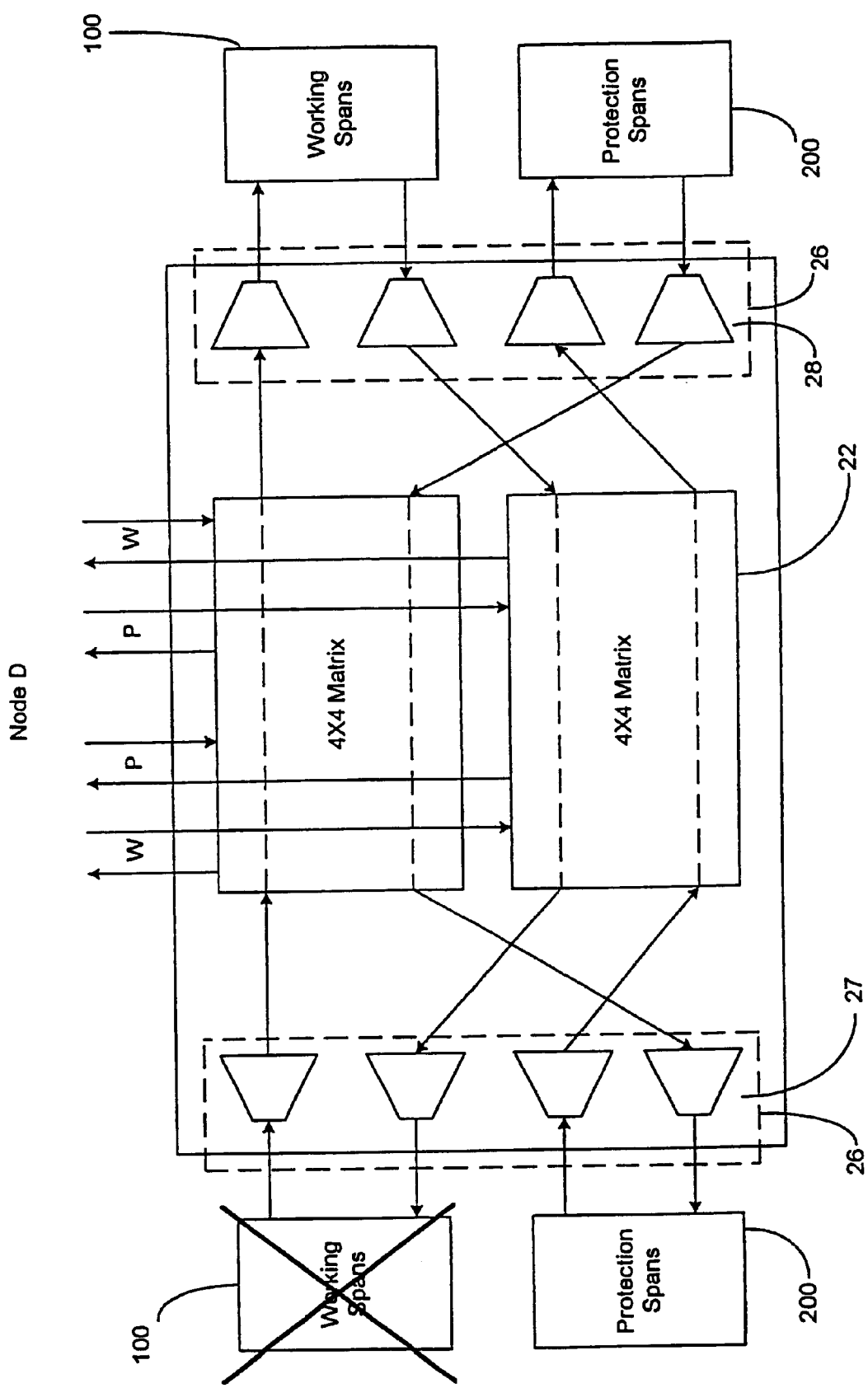
FIG. 11 is a more detailed view of node D of FIG. 9.
Figure 12:
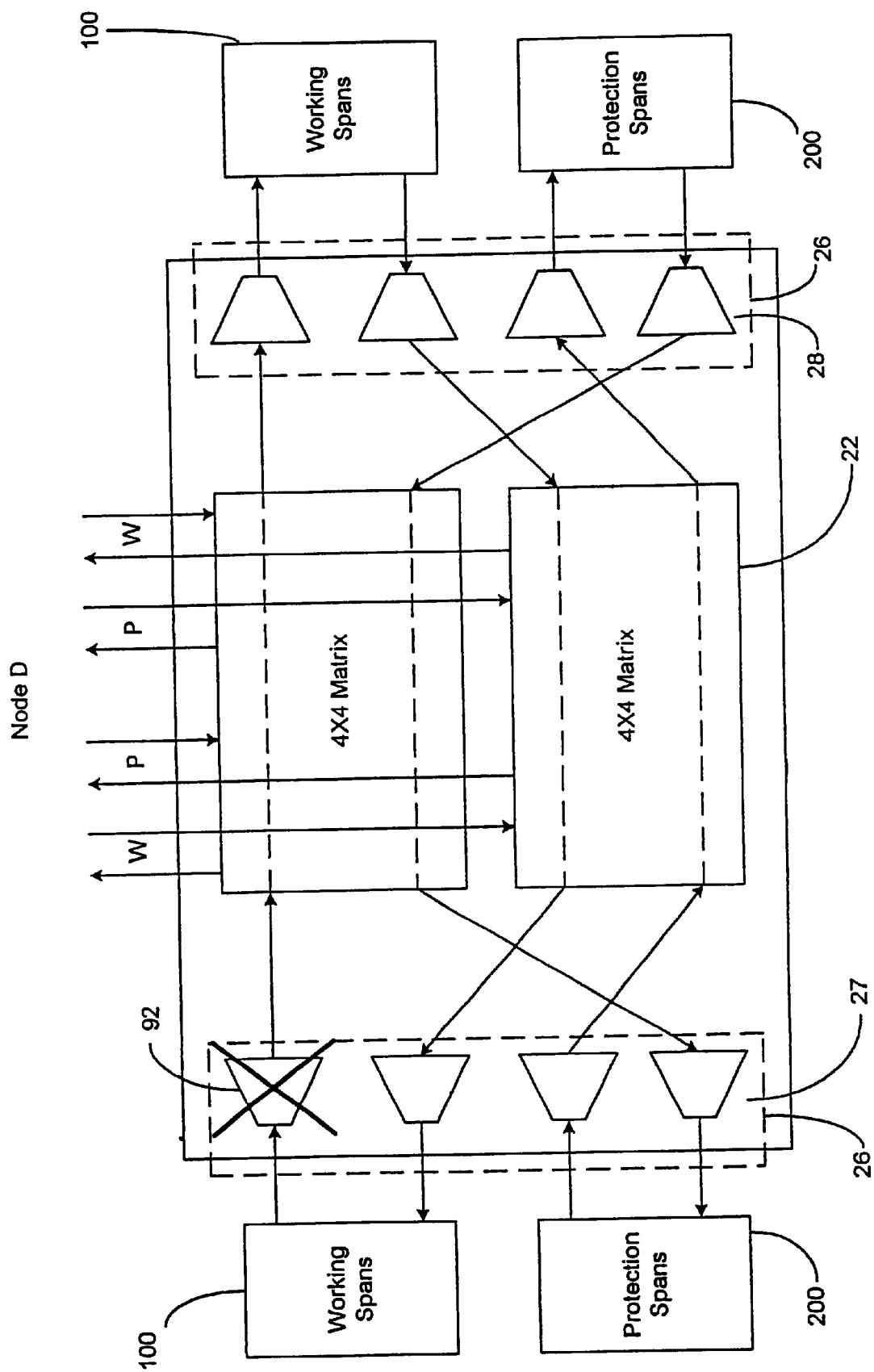
FIG. 12 is a detailed view of a through node with a single point failure of a demultiplexer.
Figure 13:
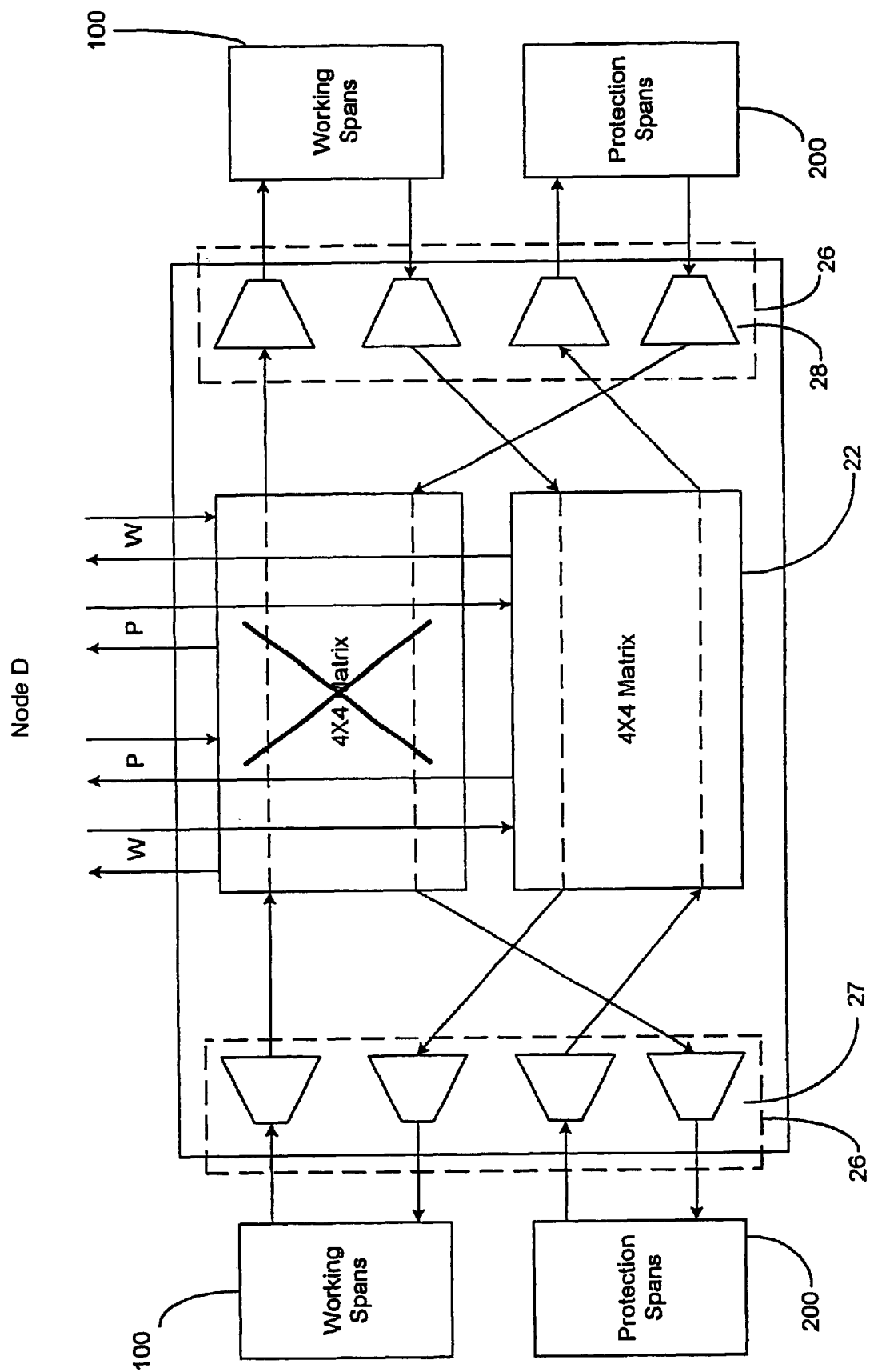
FIG. 13 is a detailed view of a through node with a single point failure of a 4×4 switching matrix.

FIGS. 9–11 show the failure of a working span 100 that is not adjacent to add drop nodes (Node A and Node B). It can be appreciated that the through Nodes C and D have no client network elements for that optical channel and therefore do not need to perform any switching by either the matrices or the clients. This is shown in FIG. 11. Here, while no switches need to be thrown in the through nodes, the nearest network elements, second client network element 24 of Node B and third client network element 41 of Node A, must throw their respective electrical protection switches 31. This is shown for client network element 24 in FIG. 10. The same self-healing mechanism found in FIGS. 9–11 would apply if there was an internal equipment failure within a through node, such as a multiplexer device 92 (see FIG. 12) or an optical switch matrix failure (see FIG. 13).

Figure 14:
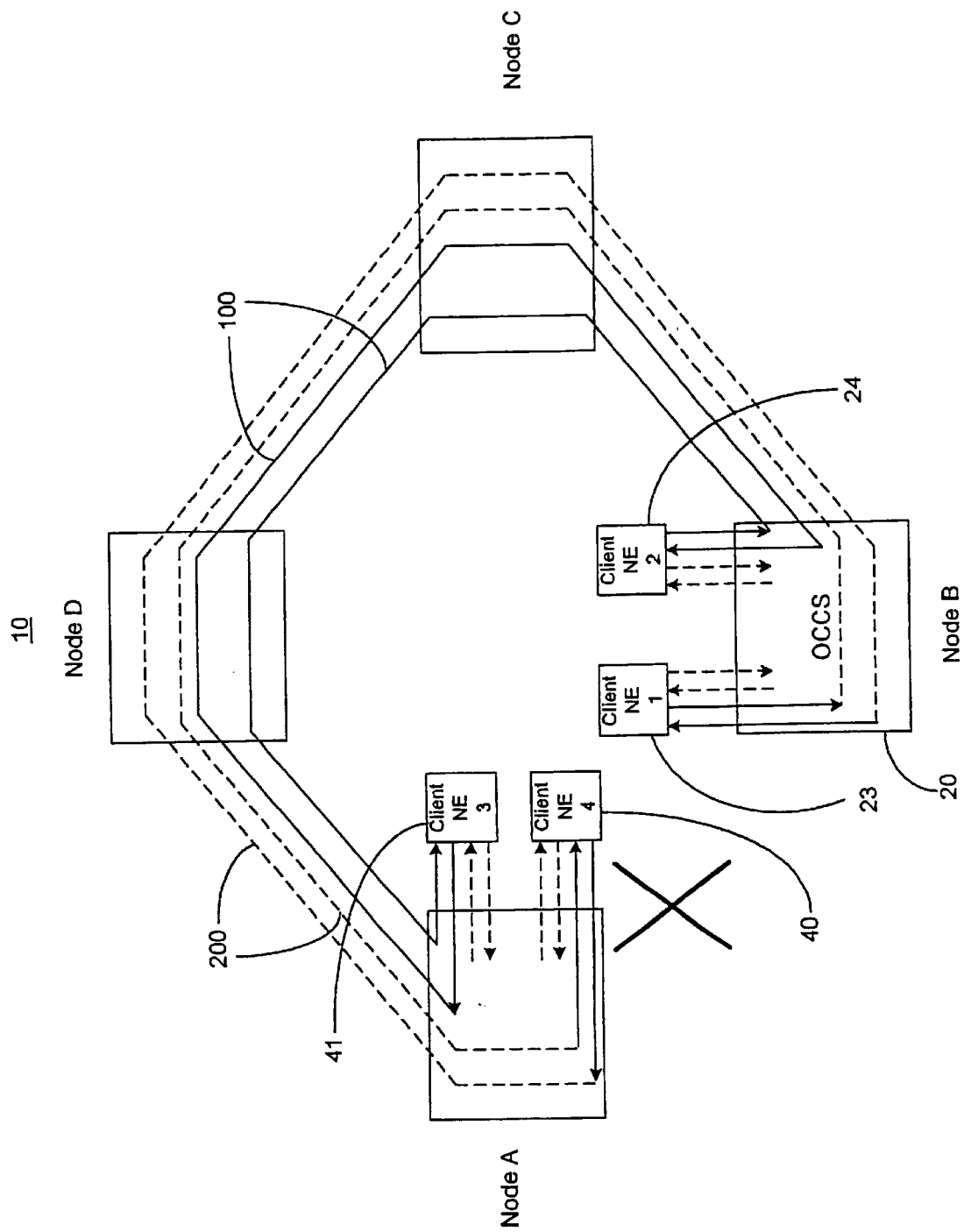
FIG. 14 is a schematic illustration of a bidirectional optical ring with a single point failure occurring as a cable cut between add drop nodes.
Figure 15:
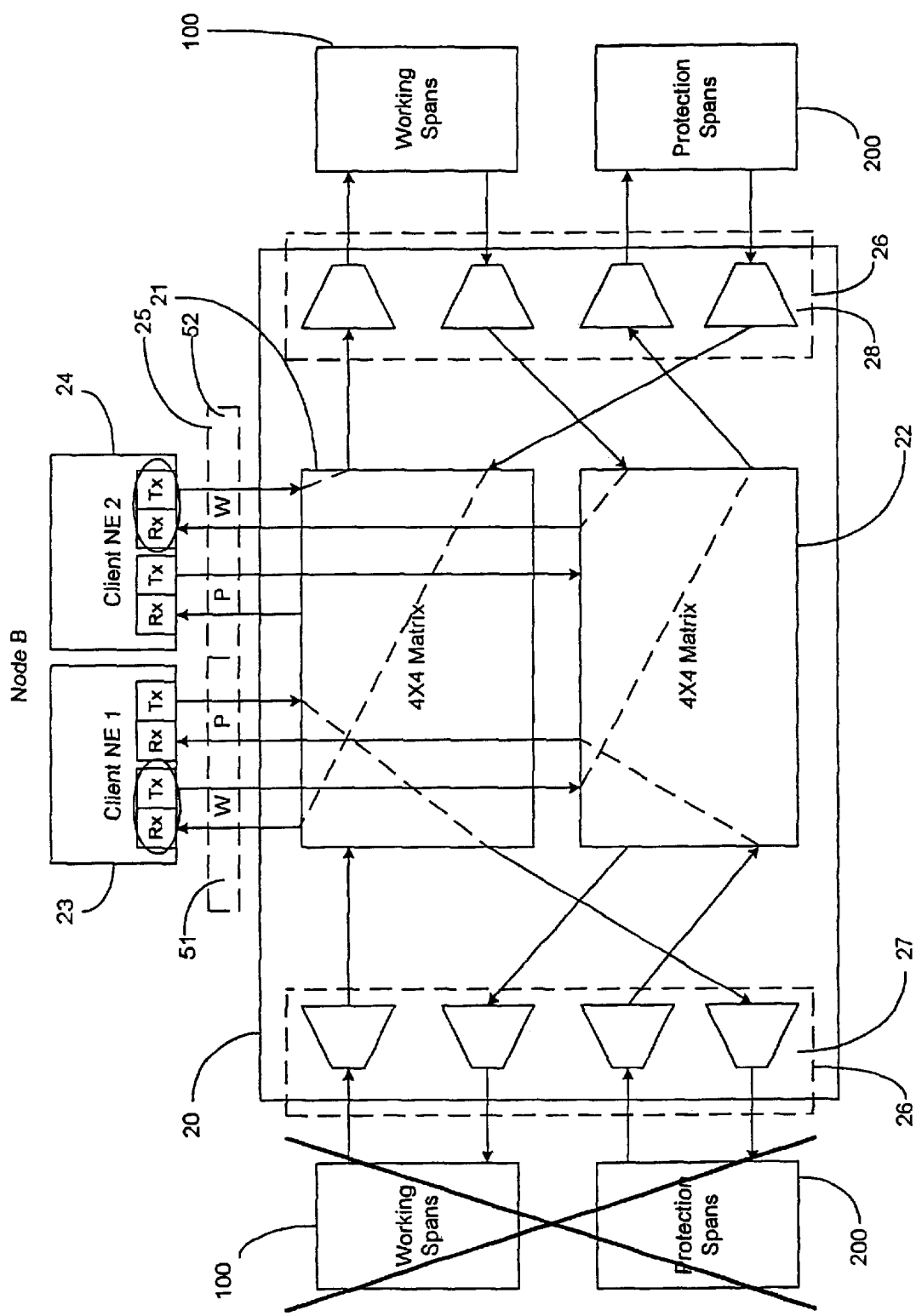
FIG. 15 is a more detailed view of node B of FIG. 14.

The more complicated scenario to overcome is a cable cut as shown in FIG. 14. In this situation, client network elements at adjacent nodes cannot simply choose the protection traffic from the same ports as in earlier examples, because that routing has also been interrupted. As shown in FIG. 15, Node B must therefore route the working traffic from first client network element 23 to the available protection spans 200 through the port opposite of the cable cut. The through Nodes C and D send these signals to Node A, where Node A connects them with client network element 40 in a similar fashion. This requires coordinated action among Nodes A, B, C, and D. Signaling among the nodes coordinates this reconfiguration action. One implementation of such signaling would be via messages sent across an optical supervisory channel that is terminated by each OCCS.

Figure 16:
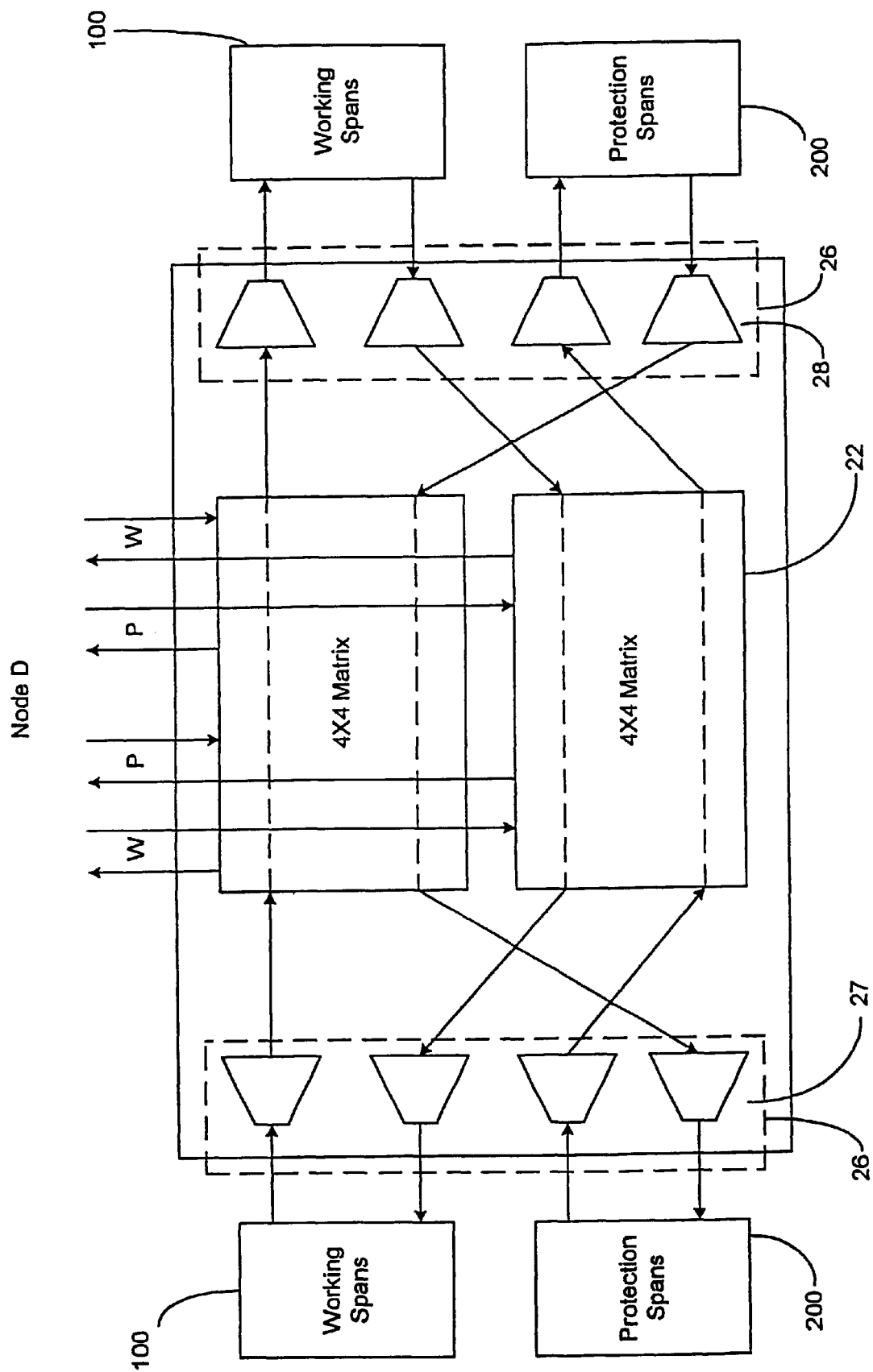
FIG. 16 is a more detailed view of node D of FIG. 14.

Note that the working traffic connecting client network element 24 and 41 is not interrupted by the above self-healing procedure. The protection traffic between client network elements 24 and client network element 41, however, has been lost in order to use it to reroute the optical channels between client network elements 23 and 40. The rearranged connections within Node B are shown in FIG. 15. In FIG. 15, the protection traffic for second client network element 24 is in an open connection state. The switching matrices 21 and 22 should be structured as to allow for this to occur. Another option for FIG. 15 is for switching matrices 21 and 22 to disconnect the protection add and drop to first client network element 23. This would be consistent with an OCCS node that treats the protection traffic as "extra traffic," in the sense used by SONET/Synchronous Digital Hierarchy (SDH) shared protection rings. If the through Nodes C an D have already been provisioned to through-connect the appropriate protection traffic, then no switching action is necessary. This is illustrated in FIG. 16.

Thus, returning to FIG. 15, when the single point failure occurs as an adjacent cable cut, the first matrix 21 adds the working traffic from the second client network element 24 to the optical ring 10. The first matrix 21 also drops the protection traffic from the optical ring 10 to the first client network element 23 as working traffic. The second matrix 22 adds the working traffic from the first client network element 23 to the optical ring 10 as protection traffic, and drops the working traffic from the optical ring 10 to the second client network element.

Figure 17:
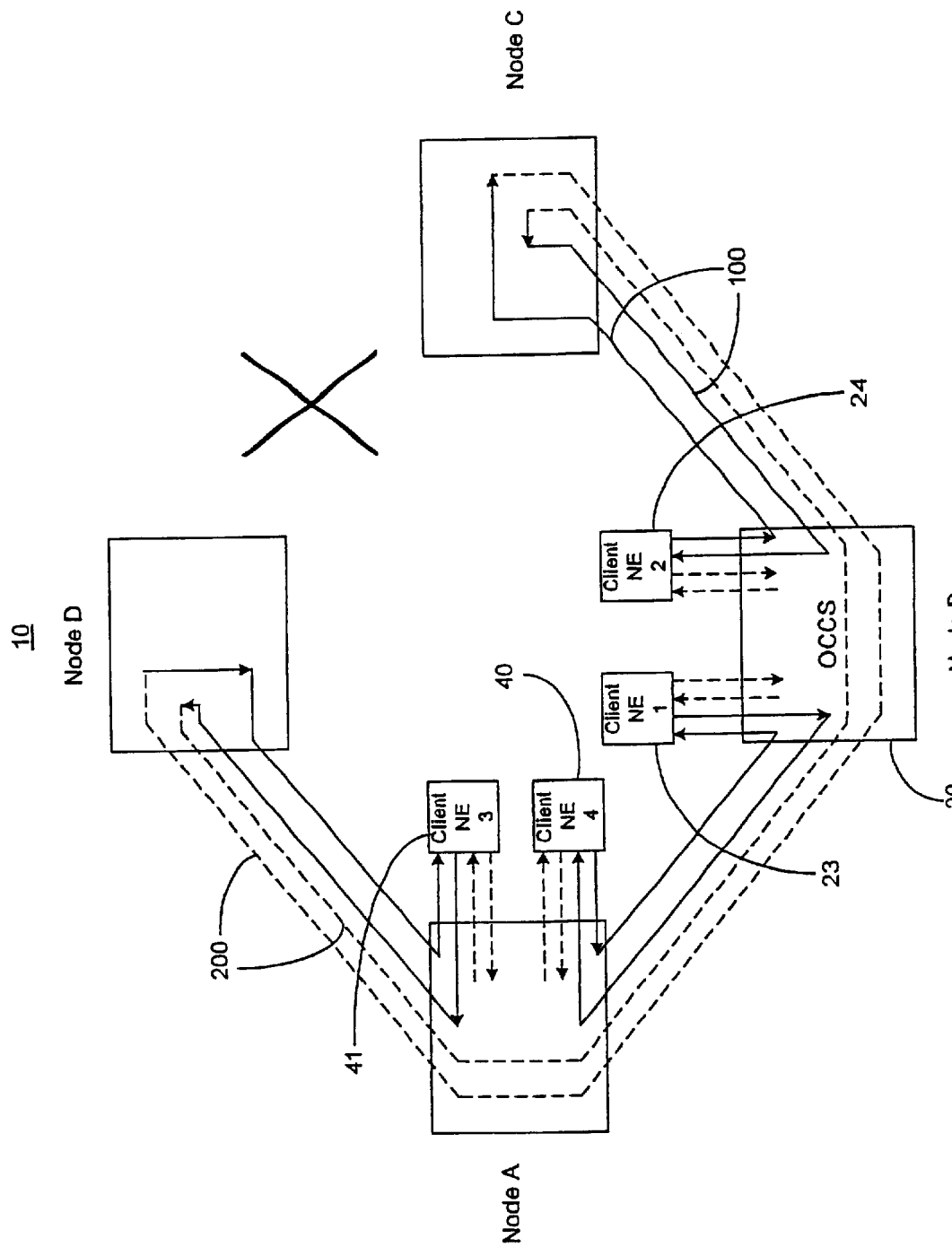
FIG. 17 is a schematic illustration of a bidirectional optical ring with a single point failure of a cable cut between through nodes.
Figure 18:
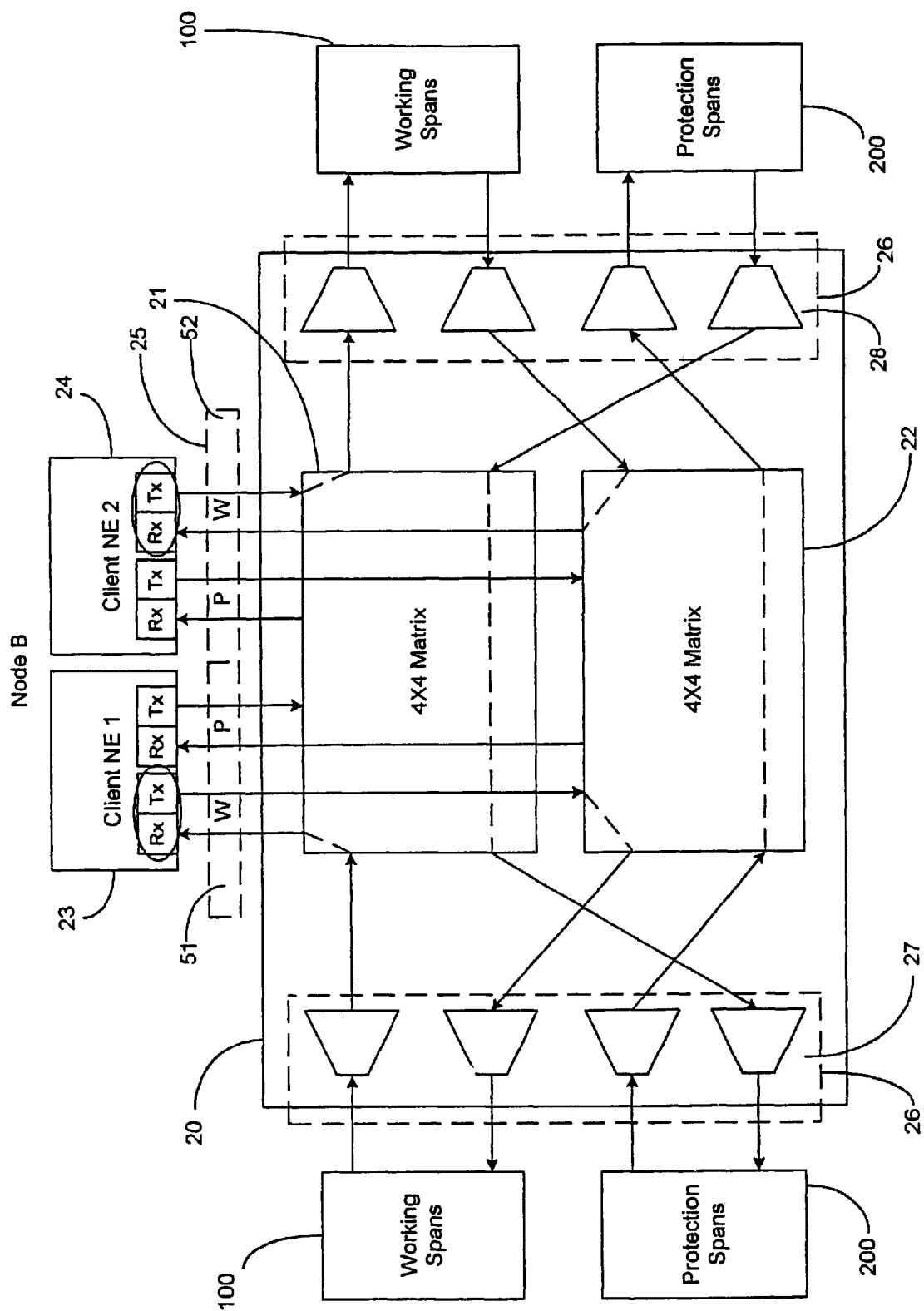
FIG. 18 is a more detailed view of node B of FIG. 17.

Another scenario to consider is a cable cut that does not occur adjacent to either of the add drop nodes. Two types of switching philosophies could be chosen. The first philosophy is to presume that the nodes adjacent to the cable cut perform a loopback switch. This self-healing mechanism is shown in FIG. 17. In this example, a cable cut has occurred between Nodes C and D. This affects the working traffic traveling between client network element 41 and 24. The self-healing occurs by looping the affected working traffic away from the failure via the protection spans 200, and eventually placing the affected traffic back into working capacity. In this example, the optical channel from client network element 24 to client network element 41 takes a routing of Node B to Node C back to Node B, then Node A, Node D, then back to Node A. Nodes not adjacent to the failure, must therefore through-connect their protection traffic. This is shown for Node B in FIG. 18.

One consequence of using this philosophy is that the network elements originally provisioned to use their protection traffic lose that ability. A ranking of failures is therefore necessary for choosing which signal failure has priority when another failure occurs. Such a ranking could be developed from that used for SONET bi-directional line switched rings. The types of failures present on the ring must also be signaled among all the nodes. An implementation of this signaling could use the optical supervisory channel presumed to be present between all the nodes. A means for communicating a failure on the link between a client network element and an OCCS is also needed, if such a failure is to be considered in the overall switching priority.

Figure 19:
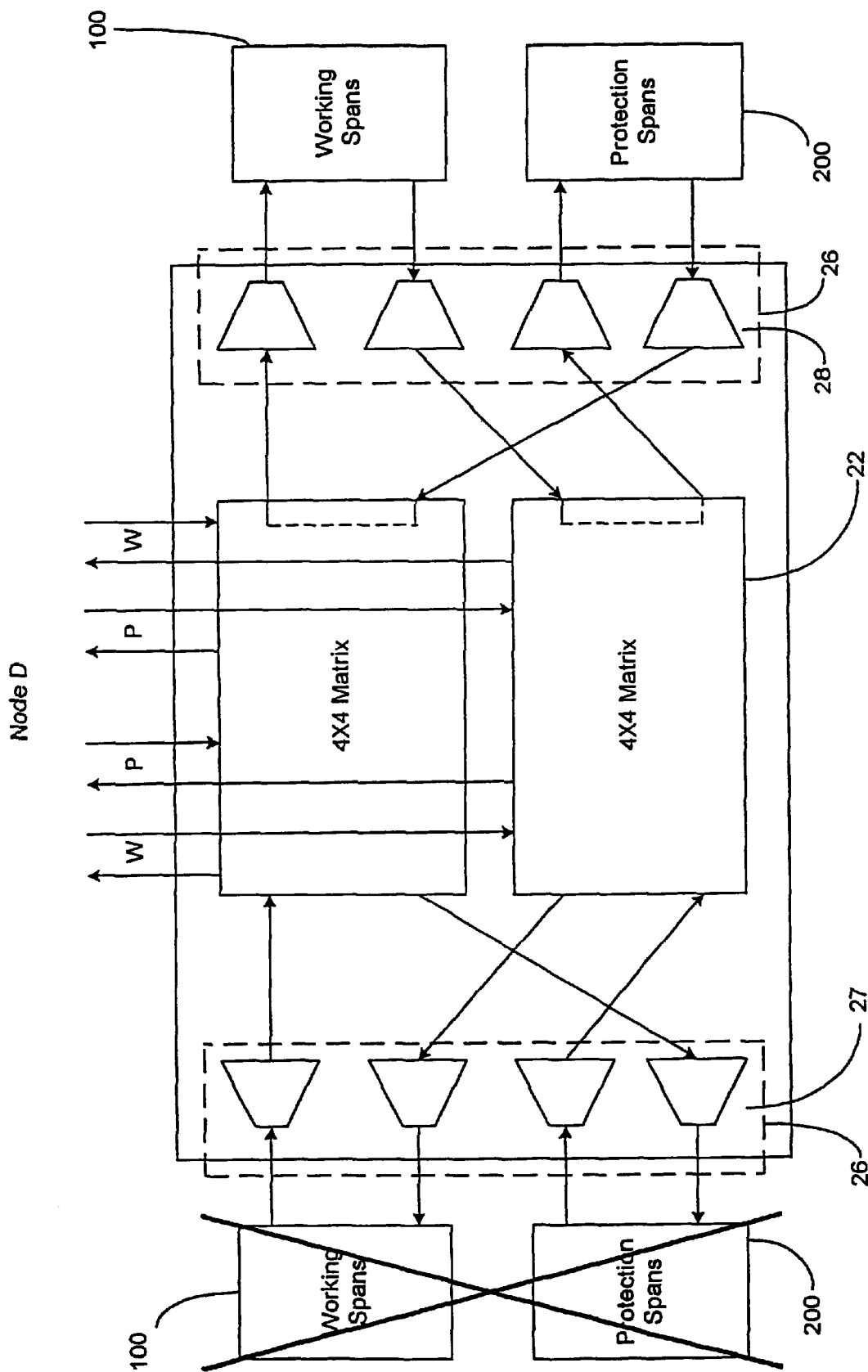
FIG. 19 is a more detailed view of node D in FIG. 17.

In the present example illustrated in FIG. 17, Nodes C and D are adjacent to the failure, so they take all the working traffic and place it on the protection fibers away from the failure. The switching action for Node D in FIG. 17 is shown in greater detail in FIG. 19.

Thus, when the single point failure occurs as a non-adjacent cable cut, nodes adjacent to the failure reverse the working traffic with the protection traffic. Returning to FIG. 18, at Node B the first matrix 21 adds the working traffic 100 from the second client network element 24 to the optical ring 10 and passes the protection traffic 200 through. The first matrix 21 also drops the working traffic from the optical ring 10 to the first client network element 23. The second matrix 22 adds the working traffic from the first client network element 23 to the optical ring 10 and passes the protection traffic through. The second matrix 22 also drops the working traffic from the optical ring to the second client network element 24.

Figure 20:
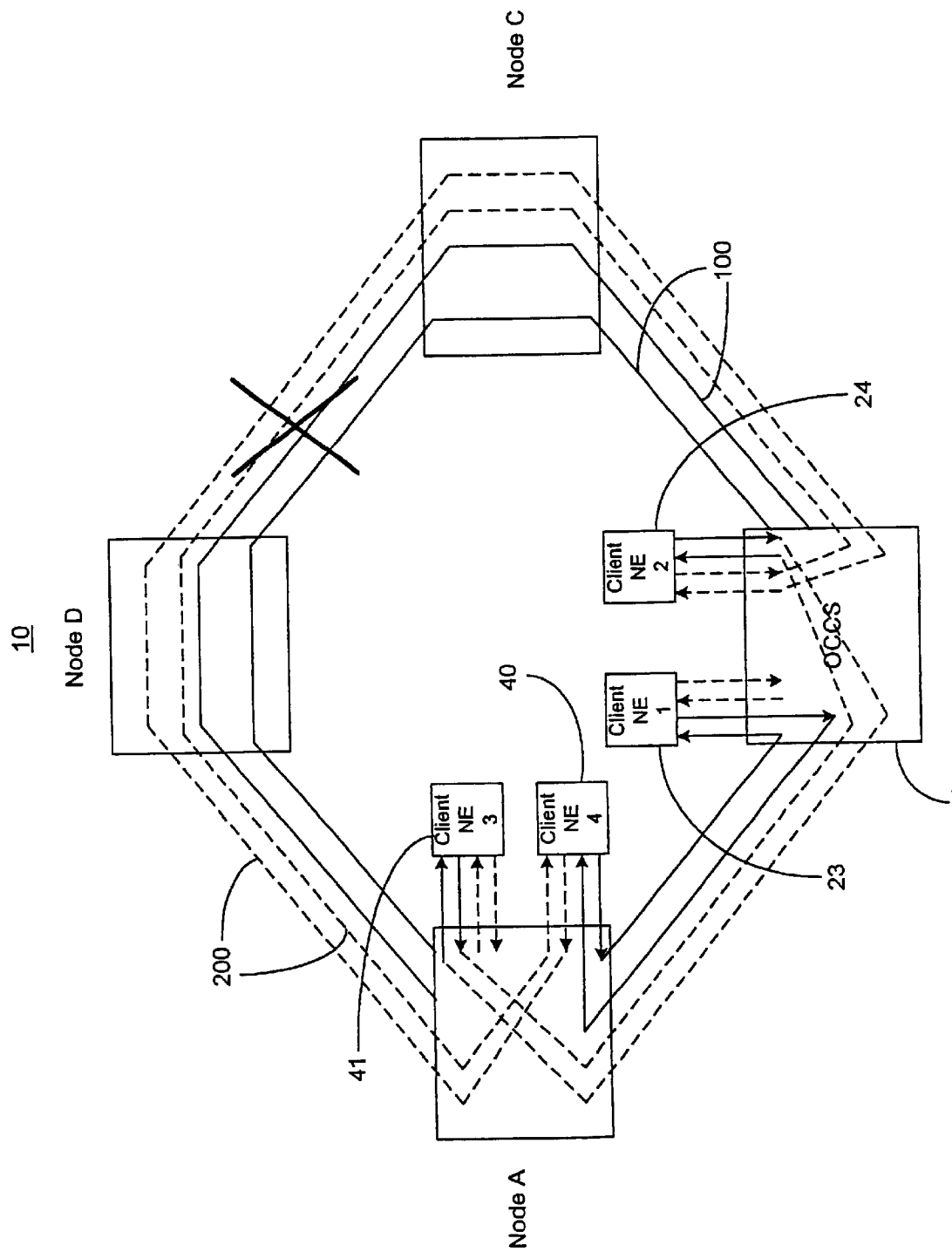
FIG. 20 is an alternative schematic illustration of a single point failure as a cable cut between through nodes.

Another philosophy is to presume that optical switching occurs whenever the working traffic is added and dropped. This is commonly termed "non-adjacent node switching." This self-healing mechanism is shown in FIG. 20.

Figure 21:
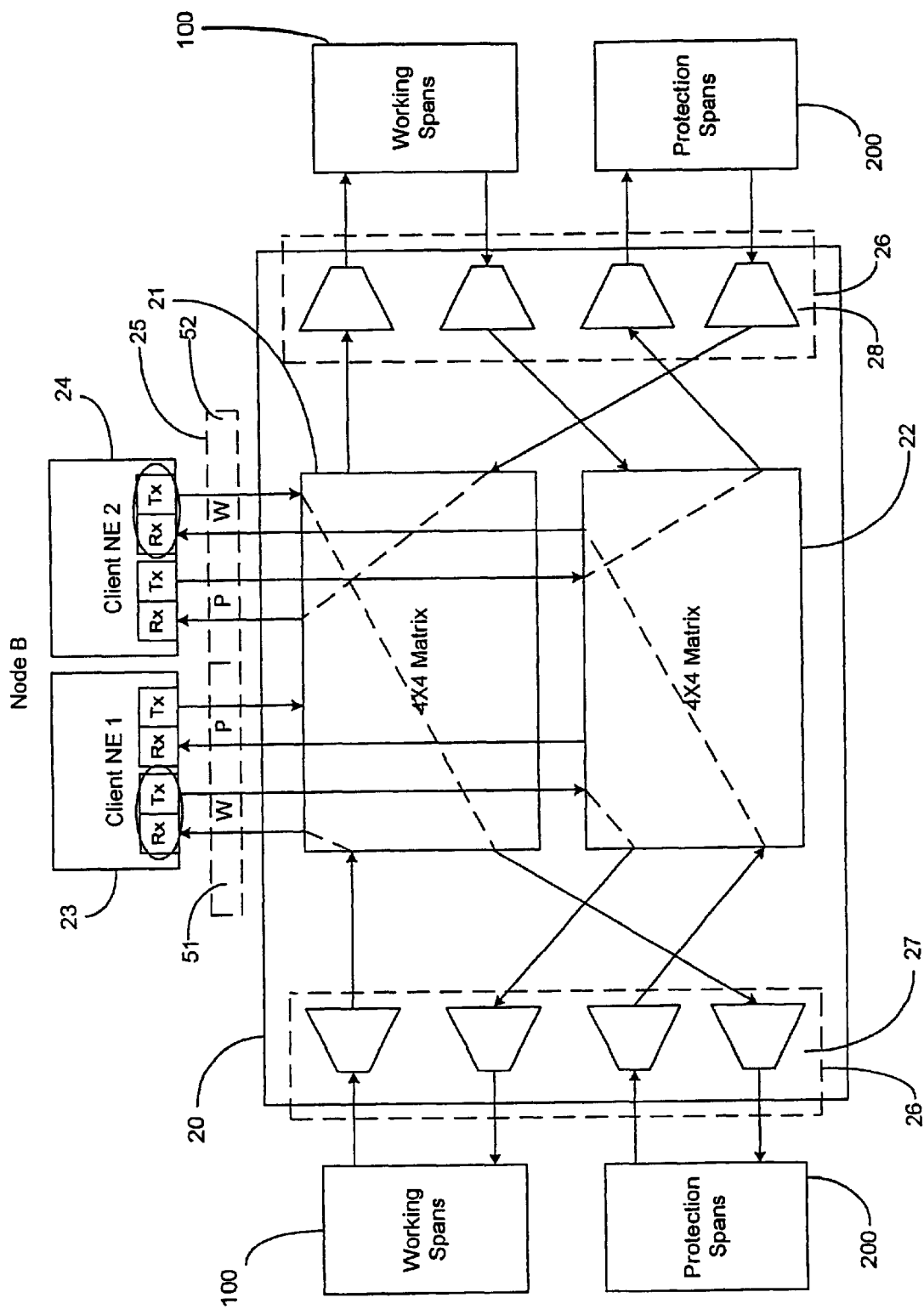
FIG. 21 is a more detailed view of node B of FIG. 20.

In this example, a cable cut has occurred between Nodes C and D. This failure affects the working traffic traveling between client network elements 24 and 41. It will be appreciated that in FIG. 17, the optical channels between client network elements 24 and 41 travel twice through Nodes A and B. A simplification occurs if Nodes A and B directly connect the working traffic to the protection spans 200 that are opposite of the direction of the failure. Here, the optical channel from client network element 24 to client network element 41 now takes a routing of Node B to Node A on the protection span 200. This is more clearly shown for Node B in FIG. 21. Another option for FIG. 21 is for switching matrices 21 and 22 to disconnect the protection add and drop to client network element 24, for the reasons discussed with regard to FIG. 15.

Again, a consequence of using this philosophy is that the network elements originally provisioned to use protection traffic loose this capacity. As mentioned for the adjacent node switching scenario, a ranking of failures is necessary to choose which signal failure has priority when another failure occurs. The types of failures present on the ring must also be signaled among all the nodes.

Figure 22:
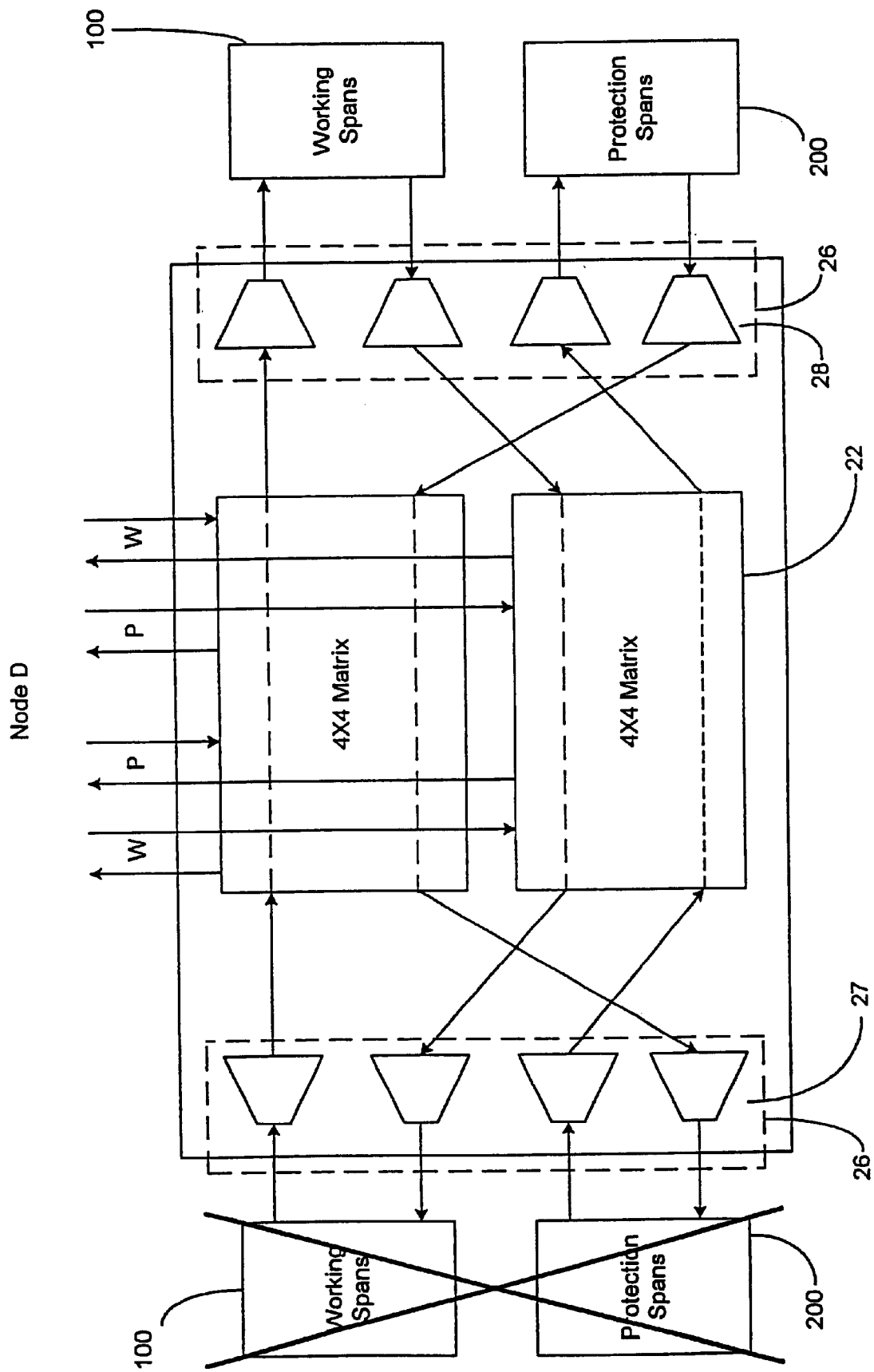
FIG. 22 is a more detailed view of node D of FIG. 20.

An advantage of non-adjacent node switching over adjacent node switching is that the longest restoration route can be no more than the number of ring spans minus one. This is the same as the longest possible working route, so no special engineering is needed for the longest restoration route. For adjacent node switching, the longest restoration route could be as large as twice the number of ring spans minus three. The through nodes (Nodes C and D), are therefore not obliged to take any switching action, even if they are adjacent to the failure. This is shown for Node D in FIG. 22.

Thus, when a single point failure occurs as a non-adjacent cable cut, the through nodes do not change. Returning to FIG. 21, at Node B the first matrix 21 adds the working traffic from the second client network element 24 to the optical ring 10 as protection traffic. The first matrix 21 also drops the working traffic from the optical ring 10 to the first client network element 23, and drops the protection traffic from the optical ring 10 to the second client network element 24. The second matrix 22 adds the working traffic from the first client network element 23 to the optical ring 10. The second matrix 22 further adds the protection traffic from the second client network element 24 to the optical ring 10, and drops the protection traffic from the optical ring 10 to the second client network element 24 as working traffic.

Figure 23:
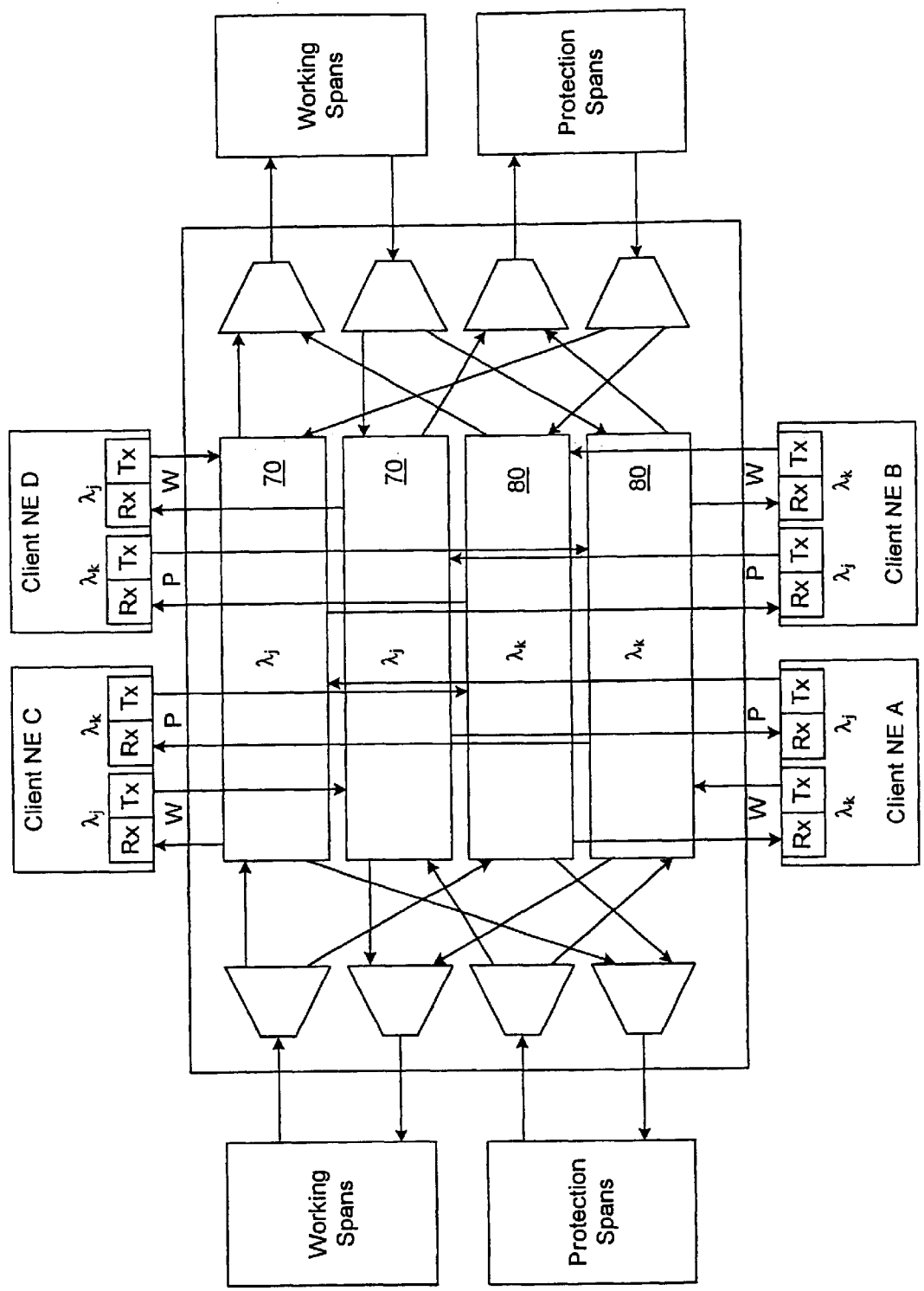
FIG. 23 is a second embodiment of an optical cross-connect system in accordance with the principals of the invention.

Other embodiments of a bidirectional optical ring 10 in accordance with the present invention are as follows. FIG. 23 shows a second embodiment. In this configuration, each client network element uses two different wavelengths for working traffic and protection traffic, respectively. Therefore, for each network element, four 4×4 switches are needed. The plurality of switching matrices includes a pair of first matrices 70 and a pair of second matrices 80. The pair of first matrices 70 routes the working traffic between the plurality of clients and the optical ring 10 at a first wavelength $\lambda_j$. The pair of second matrices 80 route the protection traffic between the plurality of clients and the optical ring 10 at a second wavelength $\lambda_k$.

Figure 24:
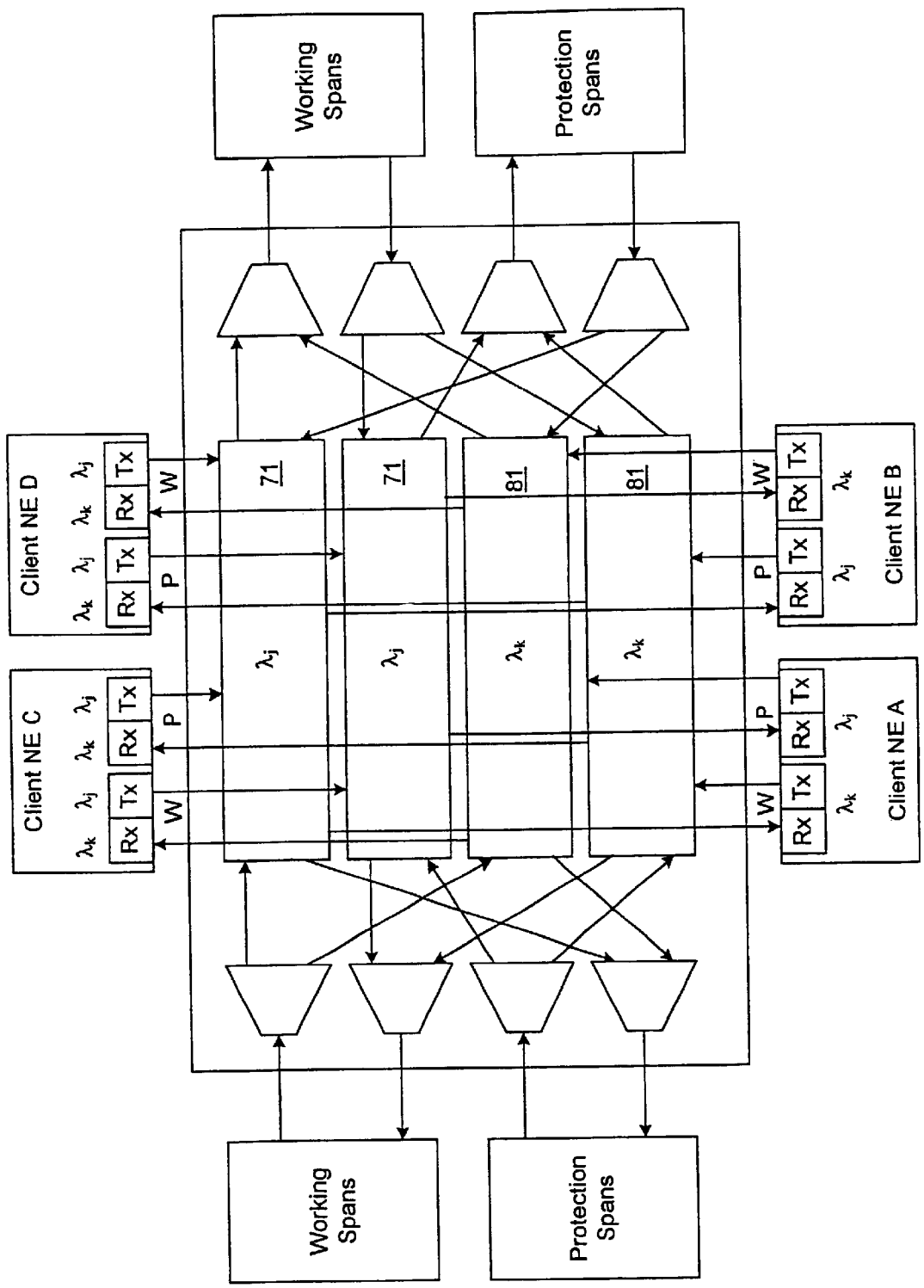
FIG. 24 is a third embodiment of an optical cross-connect system in accordance with the principals of the present invention.

Turning now to FIG. 24, a third embodiment is shown. In the third embodiment, the working and protection transmitters use one wavelength for each added client signal, and the working and protection receivers use another wavelength for each dropped client signal. Thus, once again four 4×4 switches are required to connect a client network element. The plurality of switching matrices includes a pair of first matrices 71 and a pair of second matrices 81. The pair of first matrices 71 add the working traffic and the protection traffic from the plurality of client network elements to the optical ring 10 at a first wavelength $\lambda_j$. The pair of second matrices 81 drop the working traffic and the protection traffic from the optical ring 10 to the plurality of client network elements at a second wavelength $\lambda_k$.

Figure 25:
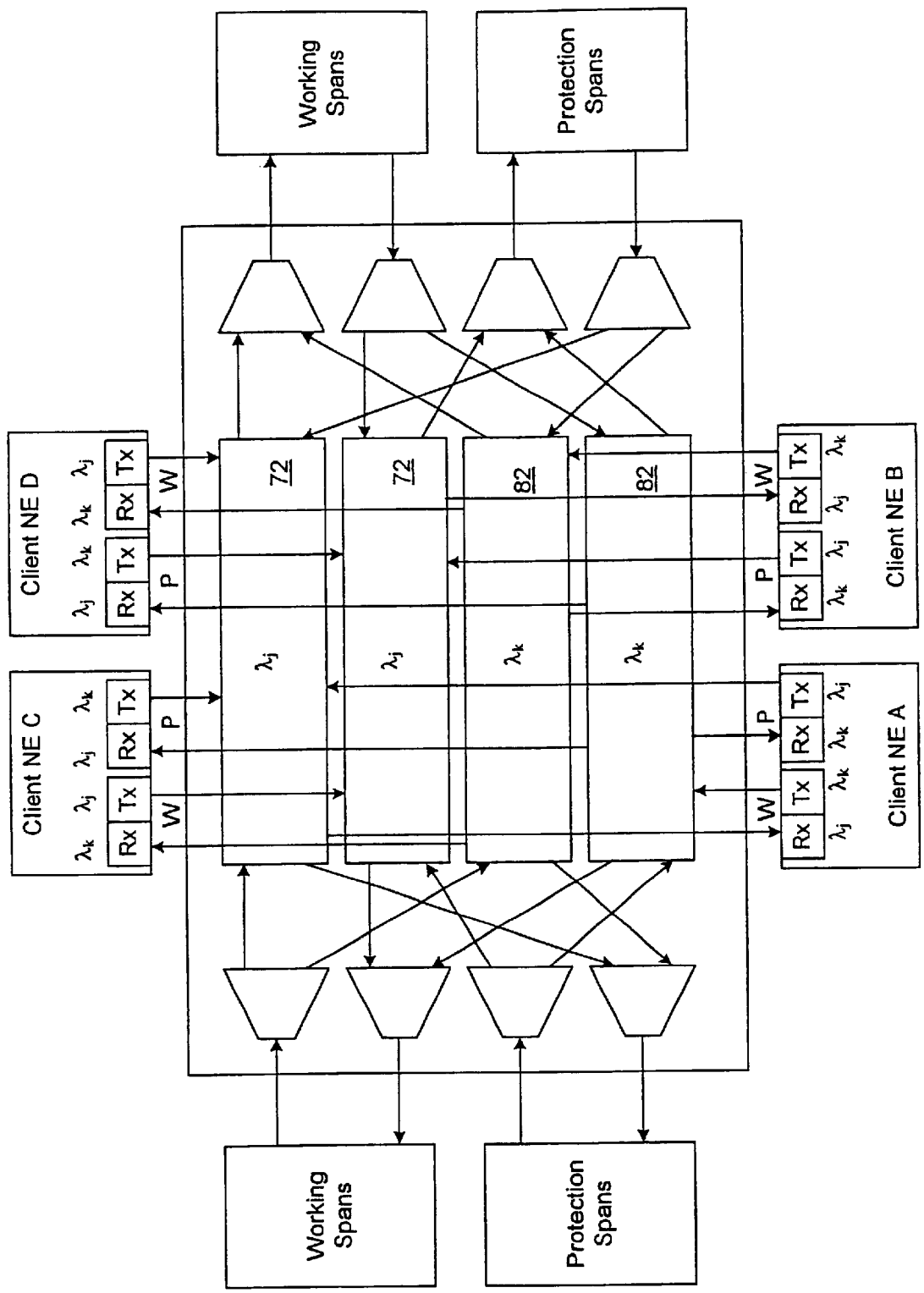
FIG. 25 is a fourth embodiment of an optical cross-connect system in accordance with the principals of the present invention.

A fourth embodiment is shown in FIG. 25. This configuration assigns one wavelength to the working transmitters and protection receivers, and another wavelength to working receivers and protection transmitters. It can be seen in FIG. 25 that connecting a client network element requires only two switches as in the preferred configuration of FIG. 2. Unlike the preferred embodiment, however, where the two switches are at the same wavelength, the two switches in the fourth embodiment are at different wavelengths. Thus, the plurality of switching matrices includes a pair of first matrices 72 and a pair of second matrices 82. The pair of first matrices 72 adds the working traffic from the plurality of clients to the optical ring 10, and drops the protection traffic from the optical ring 10 to the plurality of client network elements. The pair of second matrices 82 adds the protection traffic from the plurality of client network elements to the optical ring 10, and drops the working traffic from the optical ring 10 to the plurality of client network elements.

A single point failure in a bidirectional optical ring 10 can therefore be self-healed by carrying working traffic and redundant protection traffic between a plurality of cross-connect systems, detecting the failure in the system, and rerouting the working traffic and the protection traffic. Each OCCS 20 routes the working traffic and the protection traffic through a plurality of 4×4 optical switching matrices to a client, and each client network element selects the working traffic as an incoming signal under normal operations.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An optical cross-connect system for use with work traffic and protection traffic for a plurality of clients and an optical ring, the optical cross-connect system comprising:

a pair of 4×4 optical switching matrices for routing the working traffic and the protection traffic between the plurality of clients and the optical ring;

a client interface for transporting the working traffic and the protection traffic between the pair of 4×4 optical switching matrices and the plurality of clients; and a ring interface for transporting the working traffic and the protection traffic between the pair of 4×4 optical switching matrices and the optical ring wherein the plurality of clients includes a first client and a second client, and further wherein the pair of 4×4 optical switching matrices comprises:

a first matrix, the first matrix adding the traffic from the second client to the optical ring, adding the protection traffic from the first client to the optical ring, dropping the working traffic from the optical ring to the first client, and dropping the protection traffic from the optical ring to the second client; and a second matrix, the second matrix adding the working traffic from the first client to the optical ring, adding the protection traffic from the second client to the optical ring, dropping the working traffic from the optical ring to the second client, and dropping the protection traffic from the optical ring to the first client.

2. The optical cross-connect system of claim 1 wherein each of the plurality of client network elements has an electrical bridge and a protection switch, the electrical bridge adding the working traffic and the protection traffic to the client network element interface, and the protection switch selecting the working traffic as an incoming signal.

3. The optical cross-connect system of claim 2 including a working span wherein a single point failure occurs in the working span and affects an affected local client network element, and as a result the protection switch of the affected local client network element selects the protection traffic as an incoming signal, and wherein the pair of 4×4 optical switching matrices do not change.

4. The optical cross-connect system of claim 3 including add drop nodes with working fibers therebetween in the optical ring, wherein the single point failure occurs in the working fibers between the add drop nodes of the optical ring.

5. The optical cross-connect system of claim 3 wherein the single point failure occurs in the ring interface.

6. The optical cross-connect system of claim 3 wherein the single point failure occurs in one of the pair of 4×4 optical switching matrices.

7. The optical cross-connect system of claim 3 wherein the single point failure occurs in the client network element interface.

8. An optical cross-connect system for use with work traffic and protection traffic for a plurality of clients and an optical ring, the optical cross-connect system comprising:
   a pair of 4×4 optical switching matrices for routing the working traffic and the protection traffic between the plurality of clients and the optical ring;
   a client interface for transporting the working traffic and the protection traffic between the pair of 4×4 optical switching matrices and the plurality of clients; and
   a ring interface for transporting the working traffic and the protection traffic between the pair of 4×4 optical switching matrices and the optical wherein the plurality of clients includes a first client and a second client, and further wherein there is an adjacent cable and a single point failure occurs as an adjacent cable cut, the pair of 4×4 switching matrices comprising:
      a first matrix, the first matrix adding the working traffic from the second client to the optical ring, and dropping the protection traffic from the optical ring to the first client as the working traffic; and
      a second matrix, the second matrix adding the working traffic from the first client to the optical ring as the protection traffic, and dropping the working traffic from the optical ring to the second client.

9. An optical cross-connect system for use with work traffic and protection traffic for a plurality of clients and an optical ring, the optical cross-connect system comprising:
   a pair of 4×4 optical switching matrices for routing the working traffic and the protection traffic between the plurality of clients and the optical ring;
   a client interface for transporting the working traffic and the protection traffic between the pair of 4×4 optical switching matrices and the plurality of clients; and
   a ring interface for transporting the working traffic and the protection traffic between the pair of 4×4 optical switching matrices and the optical ring wherein the plurality of clients includes a first client and a second client, the optical cross-connect system include an adjacent cable and nodes, and wherein a single point failure occurs as a non-adjacent cable cut and nodes adjacent to the single point failure reverse the working traffic with the protection traffic, the pair of 4×4 switching matrices comprising:
      a first matrix, the first matrix adding the working traffic from the second client to the optical ring, passing the protection traffic through, and dropping the working traffic from the optical ring to the first client; and
      a second matrix, the second matrix adding the working traffic from the first client to the optical ring, passing the protection traffic through, and dropping the working traffic from the optical ring to the second client.

10. An optical cross-connect system for use with work traffic and protection traffic for a plurality of clients and an optical ring, the optical cross-connect system comprising:
    a pair of 4×4 optical switching matrices for routing the working traffic and the protection traffic between the plurality of clients and the optical ring;
    a client interface for transporting the working traffic and the protection traffic between the pair of 4×4 optical switching matrices and the plurality of clients; and
    a ring interface for transporting the working traffic and the protection traffic between the pair of 4×4 optical switching matrices and the optical ring including an adjacent cable and nodes wherein a single point failure occurs as a non-adjacent cable cut and the nodes do not change, the pair of 4×4 switching matrices comprising:
       a first matrix, the first matrix adding the working traffic from the second client to the optical ring as protection traffic, dropping the working traffic from the optical ring to the first client, and dropping the protection traffic from the optical ring to the second client; and
       a second matrix, the second matrix adding the working traffic from the first client to the optical ring, adding the protection traffic from the second client to the optical ring, and dropping the protection traffic from the optical ring to the second client as the working traffic.

11. A bi-directional optical ring for use with working traffic and protection traffic and a plurality of clients, the bi-directional optical ring comprising:
    a plurality of optical cross-connect systems, each of the plurality of optical cross-connect systems having a plurality of 4×4 optical switching matrices for routing the working traffic and the protection traffic between the plurality of clients and the optical ring;
    a plurality of working spans, each of the plurality of working spans carrying the working traffic between adjacent ones of the plurality of optical cross-connect systems; and
    a plurality of protection spans, each of the plurality of protection spans carrying the protection traffic between adjacent ones of the optical cross-connect systems wherein each of the plurality of 4×4 optical switching matrices comprises:
       a pair of first matrices, the pair of first matrices routing the working traffic between the plurality of clients and the optical ring at a first wavelength; and
       a pair of second matrices, the pair of second matrices routing the protection traffic between the plurality of clients and the optical ring at a second wavelength.

12. A bi-directional optical ring for use with working traffic and protection traffic and a plurality of clients, the bi-directional optical ring comprising:
    a plurality of optical cross-connect systems, each of the plurality of optical cross-connect systems having a plurality of 4×4 optical switching matrices for routing the working traffic and the protection traffic between the plurality of clients and the optical ring;
    a plurality of working spans, each of the plurality of working spans carrying the working traffic between adjacent ones of the plurality of optical cross-connect systems; and a plurality of protection spans, each of the plurality of protection spans carrying the protection traffic between adjacent ones of the optical cross-connect systems wherein each of the plurality of 4×4 optical switching matrices comprises:

a pair of first matrices, the pair of first matrices adding the working traffic and the protection traffic from the plurality of clients to the optical ring at a first wavelength; and a pair of second matrices, the pair of second matrices dropping the working traffic and the protection traffic from the optical ring to the plurality of clients at a second wavelength.

13. A bi-directional optical ring for use with working traffic and protection traffic and a plurality of clients, the bi-directional optical ring comprising:

a plurality of optical cross-connect systems, each of the plurality of optical cross-connect systems having a plurality of 4×4 optical switching matrices for routing the working traffic and the protection traffic between the plurality of clients and the optical ring;

a plurality of working spans, each of the plurality of working spans carrying the working traffic between adjacent ones of the plurality of optical cross-connect systems; and a plurality of protection spans, each of the plurality of protection spans carrying the protection traffic between adjacent ones of the optical cross-connect systems wherein each of the plurality of 4×4 optical switching matrices comprises:

a pair of first matrices, the pair of first matrices adding the working traffic from the plurality of clients to the optical ring, and dropping the protection traffic from the optical ring to the plurality of clients at a first wavelength; and a pair of second matrices, the pair of second matrices adding the protection traffic from the plurality of clients to the optical ring, and dropping the working traffic from the optical ring to the plurality of clients at a second wavelength.

* * * * *